(12) United States Patent
Zhou et al.

(10) Patent No.: US 11,538,455 B2
(45) Date of Patent: Dec. 27, 2022

(54) SPEECH STYLE TRANSFER

(71) Applicant: DOLBY LABORATORIES LICENSING CORPORATION, San Francisco, CA (US)

(72) Inventors: Cong Zhou, Foster City, CA (US); Michael Getty Horgan, San Francisco, CA (US); Vivek Kumar, Foster City, CA (US); Jaime H. Morales, Alameda, CA (US); Cristina Michel Vasco, Austin, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 311 days.

(21) Appl. No.: 16/969,950

(22) PCT Filed: Feb. 14, 2019

(86) PCT No.: PCT/US2019/017941
§ 371 (c)(1),
(2) Date: Aug. 13, 2020

(87) PCT Pub. No.: WO2019/161011
PCT Pub. Date: Aug. 22, 2019

(65) Prior Publication Data
US 2020/0410976 A1 Dec. 31, 2020

Related U.S. Application Data

(60) Provisional application No. 62/797,864, filed on Jan. 28, 2019, provisional application No. 62/710,501, filed on Feb. 16, 2019.

(30) Foreign Application Priority Data

Feb. 16, 2018 (EP) ..................................... 18157080

(51) Int. Cl.
*G10L 25/00* (2013.01)
*G06F 15/00* (2006.01)
(Continued)

(52) U.S. Cl.
CPC .............. *G10L 13/02* (2013.01); *G06F 40/42* (2020.01); *G06N 3/0454* (2013.01);
(Continued)

(58) Field of Classification Search
None
See application file for complete search history.

(56) References Cited

U.S. PATENT DOCUMENTS 7,636,662 B2 * 12/2009 Dimtrova ........... H04N 21/8106
704/265
8,527,276 B1 * 9/2013 Senior .................... G06N 3/084
704/258

(Continued)

FOREIGN PATENT DOCUMENTS

| CN | 101199002 | 6/2008 |
|---|---|---|
| CN | 105869630 | 8/2016 |

(Continued)

OTHER PUBLICATIONS

Arik, S. O. et al. "Deep Voice 2: Multi-Speaker Neural Text-to-Speech" May 24, 2017.

(Continued)

*Primary Examiner* — Satwant K Singh

(57) ABSTRACT

Computer-implemented methods for speech synthesis are provided. A speech synthesizer may be trained to generate synthesized audio data that corresponds to words uttered by a source speaker according to speech characteristics of a target speaker. The speech synthesizer may be trained by time-stamped phoneme sequences, pitch contour data and speaker identification data. The speech synthesizer may (Continued)

include a voice modeling neural network and a conditioning neural network.

27 Claims, 14 Drawing Sheets

(51) Int. Cl.
| | | |
|---|---|---|
| *G10L 13/02* | (2013.01) | |
| *G06F 40/42* | (2020.01) | |
| *G06N 3/04* | (2006.01) | |
| *G06N 3/08* | (2006.01) | |
| *G10L 25/30* | (2013.01) | |

(52) U.S. Cl.
CPC ........... *G06N 3/0481* (2013.01); *G06N 3/084* (2013.01); *G10L 25/30* (2013.01)

(56) References Cited

U.S. PATENT DOCUMENTS

| | | | |
|---|---|---|---|
| 10,176,809 B1* | 1/2019 | Pierard | ................... G10L 15/18 |
| 2012/0253781 A1 | 10/2012 | Yao | |
| 2015/0127349 A1 | 5/2015 | Agiomyrgiannakis | |
| 2016/0379622 A1 | 12/2016 | Patel | |
| 2017/0301347 A1* | 10/2017 | Fuhrman | ............... G10L 15/063 |
| 2018/0012613 A1* | 1/2018 | Sun | ......................... G10L 25/24 |
| 2018/0315420 A1* | 11/2018 | Ash | ......................... G09B 19/06 |
| 2020/0320987 A1* | 10/2020 | Ash | ......................... G10L 25/51 |

FOREIGN PATENT DOCUMENTS

| | | |
|---|---|---|
| CN | 106328122 | 1/2017 |
| CN | 106531150 | 3/2017 |
| CN | 106875007 | 6/2017 |
| JP | 2015018080 | 1/2015 |
| JP | 2017003622 | 1/2017 |
| WO | 2010148141 | 12/2010 |

OTHER PUBLICATIONS

Lifa, S. et al. "Voice Conversion Using Deep Bidirectional Long Short-Term Memory Based Recurrent Neural Networks" IEEE International Conference on Acoustics, Speech and Signal Processing, Apr. 19, 2015, pp. 4869-4873.

Mehri, S. et al. "SampleRNN: An Unconditional End-to-End Neural Audio Generation Model" published as a conference paper at the International Conference on Learning Representations, Toulon, France, Apr. 24-26, 2017.

Mohammadi, Seyed Hamidreza, et al. "An Overview of Voice Conversion Systems" Speech Communication, vol. 88, Apr. 2017, pp. 65-82.

* cited by examiner

SPEECH STYLE TRANSFER

CROSS REFERENCE TO RELATED APPLICATIONS

This application claims the benefit of U.S. Provisional Application Nos. 62/710,501 filed on Feb. 16, 2018 and 62/797,864, filed on Jan. 28, 2019, and European Patent Application No. 18157080.5, filed on Feb. 28, 2019, each of which is incorporated by reference in its entirety.

TECHNICAL FIELD

This disclosure relates to the processing of audio signals. In particular, this disclosure relates to processing audio signals for speech style transfer implementations.

BACKGROUND

Realistically presenting the speech of person A in the style of person B is challenging. The challenge is further increased if person A and person B speak different languages. For example, consider voice actors dubbing an English-language movie in Mandarin. The voice actor that voices character A needs to voice his speech as if character A were speaking in Mandarin. The goal of speech style transfer in this case would be to generate a voice that sounds as if character A were speaking fluent Mandarin using a speaking actor's voice, in Mandarin, as input. Lifa Sun et al., "Voice Conversion Using Deep Bidirectional Long Short-Term Memory Based Recurrent Neural Networks", 2015 IEEE International Conference on Acoustics, Speech and Signal Processing (ICASSP), IEEE, 19 Apr. 2015, pages 4869-4873, describes use of Deep Bidirectional Long Short-Term Memory based Recurrent Neural Networks (DBL-STM-RNNs) for voice conversion.

SUMMARY

Various audio processing methods are disclosed herein. Some such methods may involve training a speech synthesizer. A method may be computer-implemented in some examples. For example, the method may be implemented, at least in part, via a control system comprising one or more processors and one or more non-transitory storage media. In some such examples, the training may involve: (a) receiving, by a content extraction process implemented via a control system comprising one or more processors and one or more non-transitory storage media, first audio data corresponding to first speech of a first person; (b) producing, by the content extraction process, a first time-stamped phoneme sequence and first pitch contour data corresponding to the first speech; (c) receiving, by a first neural network implemented via the control system, the first time-stamped phoneme sequence and the first pitch contour data; (d) producing, by the first neural network, first neural network output corresponding to the first time-stamped phoneme sequence and the first pitch contour data, the first neural network output comprising a plurality of frame sizes; (e) receiving, by a second neural network implemented via the control system, the first neural network output, the second neural network comprising a hierarchy of modules, each module operating at a different temporal resolution; (f) generating, by the second neural network, first predicted audio signals; (g) comparing, via the control system, the first predicted audio signals to first test data; (h) determining, via the control system, a loss function value for the first predicted audio signals; and (i) repeating (a) through (h) until a difference between a current loss function value for the first predicted audio signals and a prior loss function value for the first predicted audio signals is less than or equal to a predetermined value.

According to some implementations, at least some operations of the method may involve changing a physical state of at least one non-transitory storage medium location. For example, repeating (f) may involve changing a physical state of at least one non-transitory storage medium location corresponding with at least one weight of the second neural network.

In some examples, (a) may involve receiving first time-stamped text corresponding to the first speech of the first person. Alternatively, or additionally, (a) may involve receiving first identification data corresponding to the first person.

In some implementations, the method may involve controlling the speech synthesizer for speech generation. In some such implementations, the speech generation may involve: (j) receiving, by the content extraction process, second audio data corresponding to second speech of a second person, second time-stamped text corresponding to the second speech and first identification data corresponding to speech of the first person; (k) producing, by the content extraction process, a second time-stamped phoneme sequence and second pitch contour data corresponding to the second speech; (l) receiving, by the first neural network, the second time-stamped phoneme sequence and the second pitch contour data of (k); (m) producing, by the first neural network, first neural network output corresponding to the second time-stamped phoneme sequence and the second pitch contour data of (k); (n) receiving, by the second neural network, the first neural network output of (m) and the first identification data; and (o) generating, by the second neural network, synthesized audio data corresponding to the first neural network output of (m) and the first identification data. According to some examples, the second audio data may correspond to speech of the first person when the first person was a different age. In some such examples, the second audio data may be speech that is received from the first person at a current time, or a recent time. The first speech of the first person may, for example, correspond to speech of the first person when the first person was younger.

According to some examples, the synthesized audio data may correspond to words uttered by the second person according to speech characteristics of the first person. In some such examples, the training may involve receiving the first audio data in a first language and the synthesized audio data may correspond to words uttered by the second person in a second language. However, in some alternative examples, the synthesized audio data may correspond to words uttered by the first person at a second age according to speech characteristics of the first person at a first age, or during a time in which the first person was in a first age range. The first age may, for example, be a younger age than the second age. Some examples may involve causing one or more transducers to reproduce the synthesized audio data.

According to some implementations, the training may involve receiving, by a third neural network, the first audio data. In some such implementations, the training may involve training the third neural network to determine first speech characteristics corresponding to speech of the first person and to output encoded audio data.

In some examples, the training may involve training a fourth neural network to determine whether the encoded audio data corresponds to speech of the first person. In some such examples, the speech generation may involve: receiving, by the third neural network, the second audio data; generating, by the third neural network, second encoded audio data corresponding to the second audio data; receiving, by the fourth neural network, the second encoded audio data; generating modified second encoded audio data via an iterative process until the fourth neural network determines that the modified second encoded audio data corresponds to speech of the first person. According to some implementations, after the fourth neural network determines that the modified second encoded audio data corresponds to speech of the first person, the method may involve providing the modified second encoded audio data to the second neural network.

In some implementations, repeating (a) through (h) may involve training at least one of the first neural network or the second neural network via backward propagation based on a current loss function value. According to some examples, the first neural network may include a bi-directional recurrent neural network.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in a non-transitory medium having software stored thereon. The software may, for example, include instructions for controlling at least one device to process audio data. The software may, for example, be executable by one or more components of a control system such as those disclosed herein. The software may, for example, include instructions for performing one or more of the methods disclosed herein.

At least some aspects of the present disclosure may be implemented via apparatus. For example, one or more devices may be configured for performing, at least in part, the methods disclosed herein. In some implementations, an apparatus may include an interface system and a control system. The interface system may include one or more network interfaces, one or more interfaces between the control system and a memory system, one or more interfaces between the control system and another device and/or one or more external device interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

According to some such examples, the apparatus may include an interface system and a control system. The control system may, for example, be configured for implementing a speech synthesizer. In some implementations, the speech synthesizer may include a content extractor, a first neural network and a second neural network. The first neural network may, for example, include a bi-directional recurrent neural network. According to some implementations, the second neural network may include a plurality of modules, which may in some instances be a hierarchy of modules. In some such examples, each module may operate at a different temporal resolution.

According to some such examples, the first neural network and the second neural network may have been trained according to a process that includes: (a) receiving, via the interface system and by the content extractor, first audio data corresponding to first speech of a first person; (b) producing, by the content extractor, a first time-stamped phoneme sequence and first pitch contour data corresponding to the first speech; (c) receiving, by the first neural network, the first time-stamped phoneme sequence and the first pitch contour data; (d) producing, by the first neural network, first neural network output corresponding to the first time-stamped phoneme sequence and the first pitch contour data, the first neural network output comprising a plurality of frame sizes, each of the frame sizes corresponding with a temporal resolution of a module of the second neural network; (e) receiving, by the second neural network, the first neural network output; (f) generating, by the second neural network, first predicted audio signals; (g) comparing the first predicted audio signals to first test data; (h) determining a loss function value for the first predicted audio signals; and (i) repeating (a) through (h) until a difference between a current loss function value for the first predicted audio signals and a prior loss function value for the first predicted audio signals is less than or equal to a predetermined value.

In some implementations, the control system may be configured for controlling the speech synthesizer module for speech generation. The speech generation may, for example, involve: (j) receiving, by the content extractor and via the interface system, second audio data corresponding to second speech of a second person, second time-stamped text corresponding to the second speech and first identification data corresponding to speech of the first person; (k) producing, by the content extractor, a second time-stamped phoneme sequence and second pitch contour data corresponding to the second speech; (l) receiving, by the first neural network, the second time-stamped phoneme sequence and the second pitch contour data of (k); (m) producing, by the first neural network, first neural network output corresponding to the second time-stamped phoneme sequence and the second pitch contour data of (k); (n) receiving, by the second neural network, the first neural network output of (m) and the first identification data; and (o) generating, by the second neural network, synthesized audio data corresponding to the first neural network output of (m) and the first identification data. According to some examples, the second audio data may correspond to speech of the first person when the first person was a different age, or in a different range of ages. In some such examples, the second audio data may be speech that is received from the first person at a current time, or a recent time. The first speech of the first person may, for example, correspond to speech of the first person when the first person was younger.

According to some examples, the synthesized audio data may correspond to words uttered by the second person according to speech characteristics of the first person. In some implementations, the training may involve receiving the first audio data in a first language and the synthesized audio data may correspond to words uttered by the second person in a second language. However, in some alternative examples, the synthesized audio data may correspond to words uttered by the first person at a second age according to speech characteristics of the first person at a first age, or during a range of ages that includes the first age (e.g., 21 through 25 years of age, 26 through 30 years of age, etc.). The first age may, for example, be a younger age than the second age. In some examples, the control system may be configured for causing one or more transducers to reproduce the second synthesized audio data. According to some implementations, generating the synthesized audio data may involve changing a physical state of at least one non-transitory storage medium location corresponding with at least one weight of the second neural network.

Some alternative aspects of the present disclosure may be implemented via apparatus. According to some such examples, the apparatus may include an interface system and a control system. The control system may, for example, be configured for implementing a speech synthesizer. In some implementations, the speech synthesizer may include a content extractor, a first neural network and a second neural network. The first neural network may, for example, include a bi-directional recurrent neural network. According to some implementations, the second neural network may include a plurality of modules, which may in some instances be a hierarchy of modules. In some such examples, each module may operate at a different temporal resolution.

According to some such examples, the second neural network may have been trained to generate first synthesized audio data corresponding to first speech of a first speaker. In some implementations, the control system may be configured for controlling the speech synthesizer for: (a) receiving, by the content extractor and via the interface system, second audio data corresponding to second speech of a second person, second time-stamped text corresponding to the second speech and first identification data corresponding to speech of the first person; (b) producing, by the content extractor, a second time-stamped phoneme sequence and second pitch contour data corresponding to the second speech; (c) receiving, by the first neural network, the second time-stamped phoneme sequence and the second pitch contour data of (b); (d) producing, by the first neural network, first neural network output corresponding to the second time-stamped phoneme sequence and the second pitch contour data of (b), the first neural network output comprising a plurality of frame sizes, each of the frame sizes corresponding with a temporal resolution of a module of the second neural network; (e) receiving, by the second neural network, the first neural network output of (d) and the first identification data; and (f) generating, by the second neural network, second synthesized audio data corresponding to the first neural network output of (d) and the first identification data.

In some implementations, the second synthesized audio data may correspond to words uttered by the second person according to speech characteristics of the first person. In some such examples, the training may involve receiving the first audio data in a first language and the synthesized audio data may correspond to words uttered by the second person in a second language. Some such examples may involve causing one or more transducers to reproduce the synthesized audio data. In some examples, generating the synthesized audio data may involve changing a physical state of at least one non-transitory storage medium location corresponding with at least one weight of the second neural network.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

Figure 1:
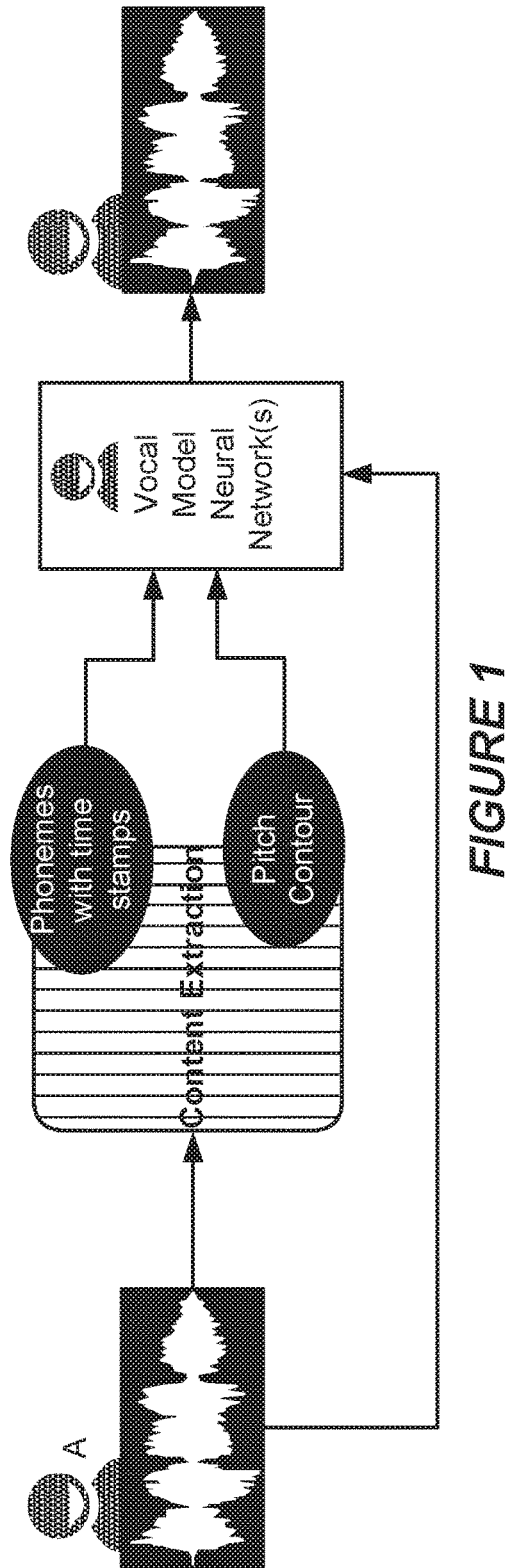
FIG. 1 shows processes of training one or more neural networks for speech style transfer according to some implementations disclosed herein.

Speech style transfer is sometimes referred to as "voice transformation" or "voice conversion," and therefore these terms may be used interchangeably herein. FIG. 1 shows processes of training one or more neural networks for speech style transfer according to some implementations disclosed herein. In the example shown in FIG. 1, the training process involves providing audio data corresponding to the speech of one person (speaker A) being fed into a content extraction block. Speaker A may, in some disclosed examples, be referred to as a "target speaker."

According to this example, the content extraction block does not require text input. A neural network based phoneme classifier may, for example, be trained and used in the content extraction block to obtain a time-stamped phoneme sequence that corresponds to input speech. Although in this example, only audio data corresponding to the speech of person A is provided as input, in alternative examples text corresponding to the speech of person A may be input along with the input speech waveforms. According to some such implementations, the text may be provided along with time stamps.

According to this example, the outputs of the content extraction block are data comprising pitch contours of the input speech, which may sometimes be referred to herein as "pitch contour data," or "intonation" as well as a time-stamped phoneme sequence corresponding to the input speech which may sometimes be referred to as speech tempo. The pitch contour data may, for example, be a function or curve that tracks the pitch of the input speech over time. According to some implementations, the pitch contour data at a particular time may correspond to a fundamental frequency of the input speech at that time, a log value of the fundamental frequency of the input speech, a normalized log value of the fundamental frequency of the input speech, or a peak (highest energy) frequency of the input speech at that time. However, in alternative examples, the pitch contour data may correspond to multiple pitches at a given time.

According to this example, the pitch contour data and the time-stamped phoneme sequence are used to train one or more vocal model neural networks to generate the same series of words used for the input speech (the "training data set"). Some examples of suitable neural networks are described below. According to some implementations, the training process may involve training two or more neural networks. According to some such implementations, the training process may involve providing the output of one or more neural networks to a second neural network. The second neural network may be a vocal model neural network. After the neural network or networks have been trained, it or they may be used for speech generation, which will also be referred to herein as "speech synthesis."

Figure 2:
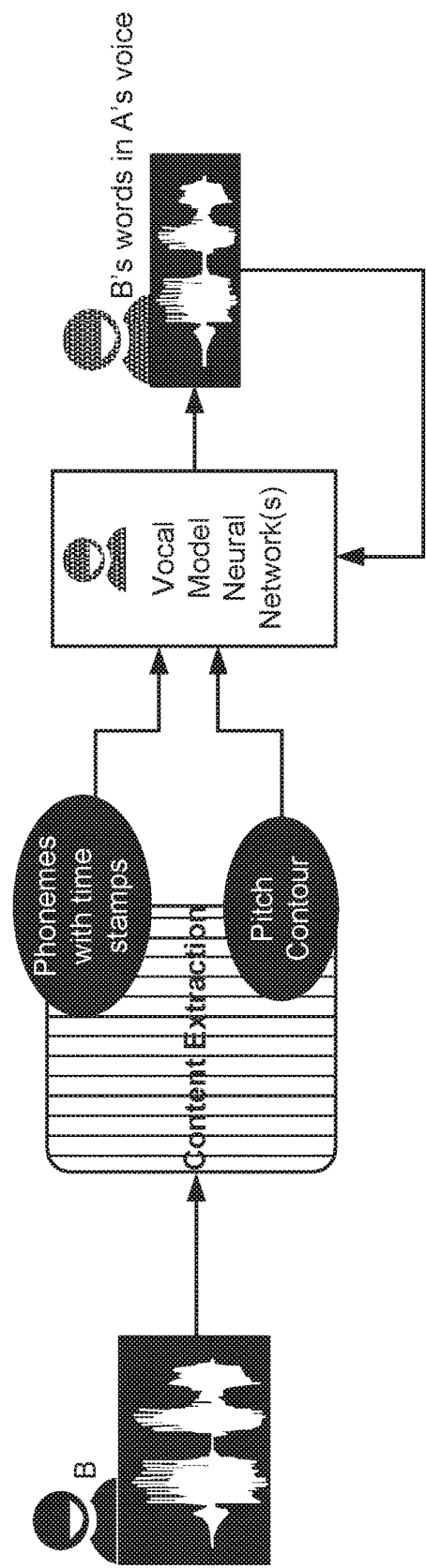
FIG. 2 shows processes of using one or more trained neural networks for speech style transfer according to some implementations disclosed herein.

FIG. 2 shows processes of using one or more trained neural networks for speech style transfer according to some implementations disclosed herein. In this example, another person's speech (speaker B's) is input to the same content extraction block that is described above with reference to FIG. 1. The pitch contour data and the time-stamped phoneme sequence of the second person's speech that are output by the content extraction block are provided to the vocal model neural network that has been trained for the voice of speaker A. In some alternative examples, the vocal model neural network has been trained for the voice of speaker A at a first age. Instead of providing another person's speech to the content extraction block, some implementations involve providing the speech of speaker A at a second age. The first age may, for example, be a younger age than the second age.

However, the vocal model neural network that has been trained for the voice of speaker A is also provided with identification data (which may be a simple "ID" or more complex identification data) corresponding to speaker A, or corresponding to the speech of speaker A. Therefore, according to this example, the vocal model neural network outputs the words of speaker B in the voice of speaker A with speaker B's speech tempo and intonation. Put another way, in this example the vocal model neural network outputs synthesized audio data includes the words uttered by speaker B according to speech characteristics of speaker A that have been learned by the vocal model neural network. In some alternative examples, a vocal model neural network that has been trained for the voice of speaker A at a first age is provided with identification data corresponding to speaker A at the first age. The input words of speaker A at a second age may be output in the voice of speaker A at the first age. The first age may, for example, be a younger age than the second age.

In some implementations, the training process may involve receiving the first audio data in a first language and the synthesized audio data may correspond to words uttered by the second person in a second language. For example, if speaker A is known to speak English and speaker B is known to speak Mandarin, the identification data for speaker A may be associated with English (language 1) and the identification data for speaker B could be associated with Mandarin (language 2). In the generation phase, the vocal model neural network or networks are provided with speech from person B, but are provided with the identification data for person A. The result is speech in language 2, in the style of person A.

Accordingly, some implementations may involve training the vocal model neural network(s) for sounds in language 1 (for example, Mandarin) that do not exist in language 2 (for example, English). Some training implementations may use a joint phoneme collection (a "superset") for both languages, instead of one for English and one for Mandarin. Some examples may involve a training process in which a target speaker who normally speaks in language 2 is prompted to make sounds that correspond with phonemes of language 1 (for example, Mandarin phonemes) for which there are no counterparts in language 2. The target speaker may, for example, repeat sounds into a microphone that are provided to her or him via headphones, so that they are not picked up by a microphone that is being used to input the target speaker's voice.

According to some alternative examples, during the training process the target speaker may provide sounds that only include phonemes of her or his native language (language 1). In some such examples, the speech generation process may involve using the most similar phoneme from language 1 when producing speech in language 2.

In some alternative implementations, the training process may involve creating a representation of a superset of atomic utterances. Atomic utterances include both phonemes and non-speech utterances humans are capable of making, including fricatives and glottal sounds. Atomic utterances are regarded by some as being the basic units of vocalization.

Various previous attempts have been made to develop satisfactory speech style transfer methods and devices. For example, "SampleRNN" is an end-to-end neural audio generation model developed by the Montreal Institute for Learning Algorithms (MILA), which generates audio one sample at a time. (See *SAMPLERNN: An Unconditional End-To-End Neural Audio Generation Model*, Published as a conference paper at the International Conference on Learning Representations, Toulon, France, Apr. 24-26, 2017.) This model combines autoregressive deep neural networks and stateful recurrent neural networks in a hierarchical structure to capture underlying sources of variations in the temporal sequences over long time spans.

Although SampleRNN represented a step forward in the voice transformation field, SampleRNN has some drawbacks. For example, the speech signal produced by SampleRNN is babbling, not intelligible speech. In addition, the emotions that are conveyed by actors cannot be voiced naturally: even the use of semantic analysis to extract emotions of a text is not satisfactory, as people can voice the same emotion in different ways. Moreover, SampleRNN provides no mechanism for handling multiple target speakers.

Some disclosed implementations provide one or more of the following potential technical improvements. For example, the speech signals produced according to various disclosed implementations is intelligible speech, not babbling. According to some implementations disclosed herein, multiple speakers' voice styles may be learned through a training process. Some embodiments do not require parallel speech from a source speaker and a target speaker for training. Some implementations take into account the semantic meaning of voice actors' input speech signals (or other talkers' input speech signals) and/or the characteristics of the input speech signals to improve the prosody of the generated speech signals. Some implementations provide a learnable high-dimensional representation of multiple target speakers, to create a more intelligible and natural-sounding speech signal.

Figure 3:
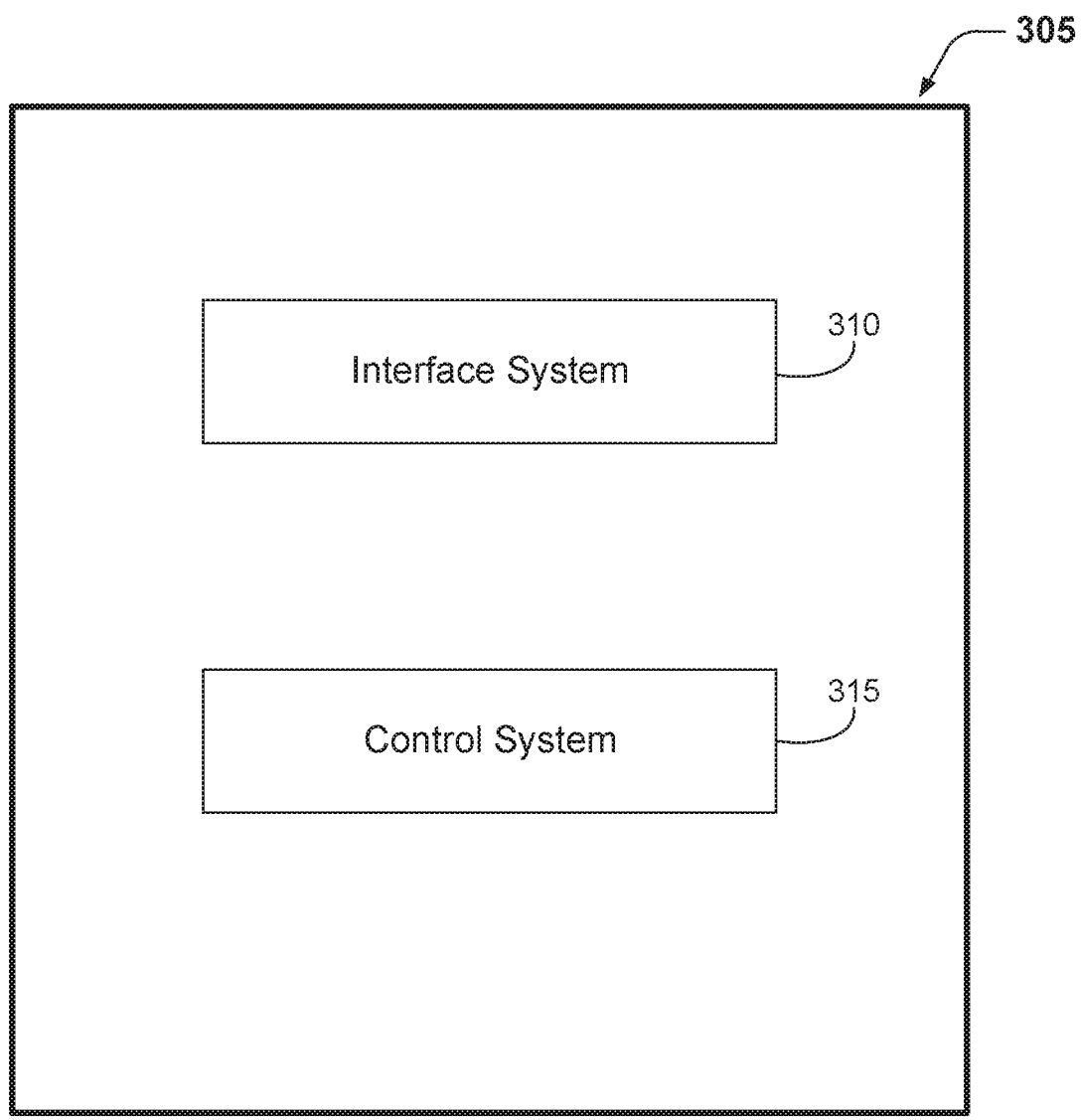
FIG. 3 is a block diagram that shows examples of components of an apparatus that may be configured to perform at least some of the methods disclosed herein.

FIG. 3 is a block diagram that shows examples of components of an apparatus that may be configured to perform at least some of the methods disclosed herein. In some examples, the apparatus 305 may be, or may include, a personal computer, a desktop computer or other local device that is configured to provide audio processing. In some examples, the apparatus 305 may be, or may include, a server. According to some examples, the apparatus 305 may be a client device that is configured for communication with a server, via a network interface. The components of the apparatus 305 may be implemented via hardware, via software stored on non-transitory media, via firmware and/or by combinations thereof. The types and numbers of components shown in FIG. 3, as well as other figures disclosed herein, are merely shown by way of example. Alternative implementations may include more, fewer and/or different components.

In this example, the apparatus 305 includes an interface system 310 and a control system 315. The interface system 310 may include one or more network interfaces, one or more interfaces between the control system 315 and a memory system and/or one or more external device interfaces (such as one or more universal serial bus (USB) interfaces). In some implementations, the interface system 310 may include a user interface system. The user interface system may be configured for receiving input from a user. In some implementations, the user interface system may be configured for providing feedback to a user. For example, the user interface system may include one or more displays with corresponding touch and/or gesture detection systems. In some examples, the user interface system may include one or more microphones and/or speakers. According to some examples, the user interface system may include apparatus for providing haptic feedback, such as a motor, a vibrator, etc. The control system 315 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some examples, the apparatus 305 may be implemented in a single device. However, in some implementations, the apparatus 305 may be implemented in more than one device. In some such implementations, functionality of the control system 315 may be included in more than one device. In some examples, the apparatus 305 may be a component of another device.

Figure 4:
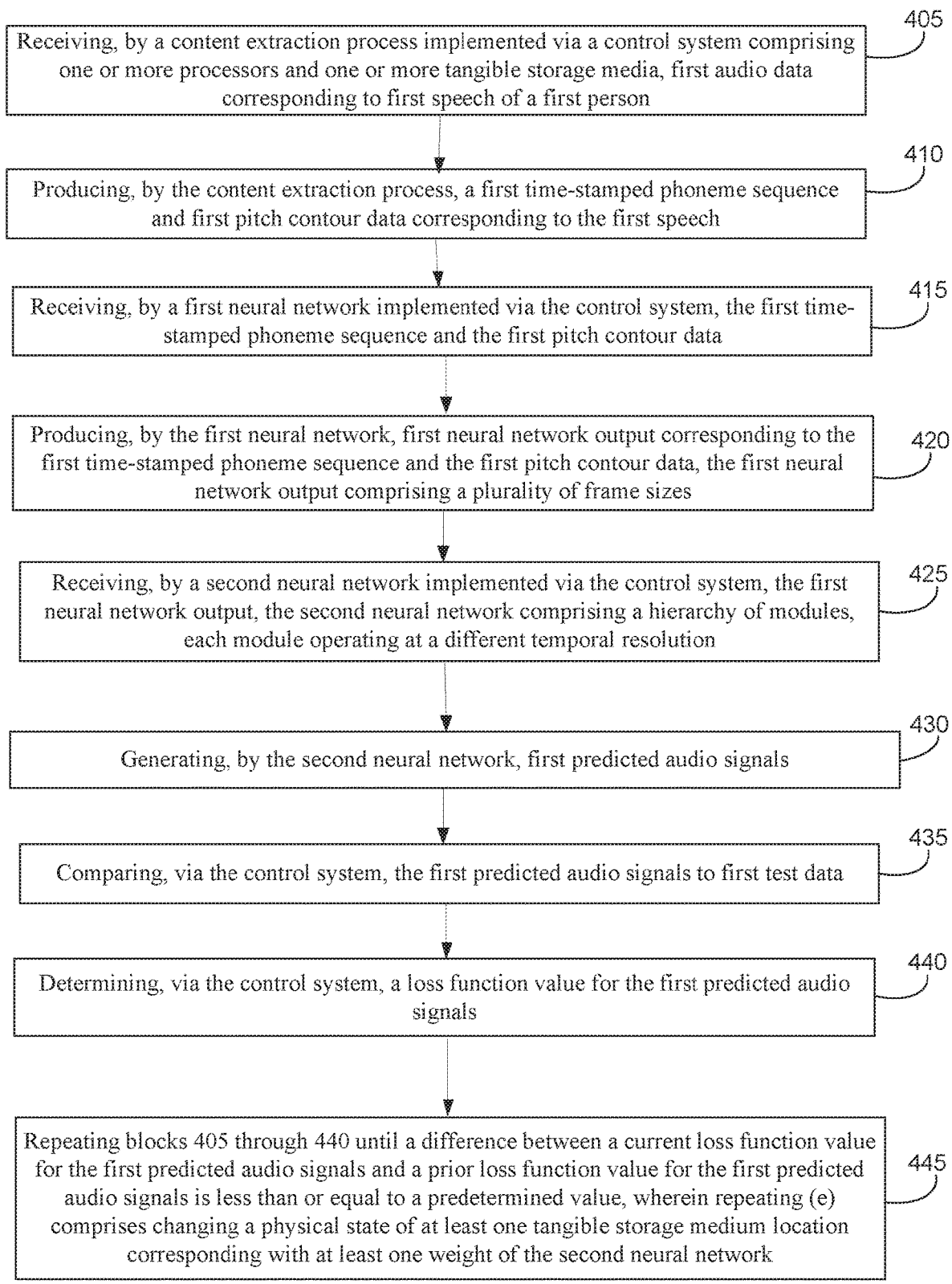
FIG. 4 is a flow diagram that outlines blocks of a method of training a speech synthesizer according to one example.

FIG. 4 is a flow diagram that outlines blocks of a method of training a speech synthesizer according to one example. The method may, in some instances, be performed by the apparatus of FIG. 3 or by another type of apparatus. In some examples, the blocks of method 400 may be implemented via software stored on one or more non-transitory media. The blocks of method 400, like other methods described herein, are not necessarily performed in the order indicated. Moreover, such methods may include more or fewer blocks than shown and/or described.

Here, block 405 involves receiving audio data corresponding to speech of a first person. In this example, the "first person" is a target speaker, who may or may not actually be the first person for whose voice the speech synthesizer has been trained. In order to maintain consistent terminology, the audio data received in block 405 may be referred to herein as the "first audio data" and the speech of the first person may be referred to herein as the "first speech."

In some examples only the first audio data from the first person may be provided as input. According to such implementations, text may be obtained from the first speech. However, such methods may not be optimal due to potential inaccuracies in speech-to-text conversion methods. Therefore, in alternative implementations block 405 involves receiving text corresponding to the first speech. The received text may include time stamps corresponding to times of the first audio data.

In some examples, block 405 may involve receiving identification data corresponding to the first person, which may be referred to herein as "first identification data." According to some examples, the first identification data may simply indicate, in essence, "this is speaker A." However, in alternative examples the first identification data may include information regarding one or more attributes of the first speech. Some examples are described below. In the training context, providing identification data can allow one or more neural networks to be trained with speech from multiple target speakers. Alternatively, or additionally, providing identification data in the training context can differentiate speech from the same person when that person is at different ages. In a simple example, the speech of speaker A at a first age (or a range of ages that includes the first age) may be designated A1 and the speech of speaker A at a second age (or a range of ages that includes the second age) may be designated A2.

According to this example, block 405 involves receiving, by a content extraction process implemented via a control system comprising one or more processors and one or more tangible storage media, the first audio data. The content extraction process may, for example, be implemented by one or more processors of the control system according to software stored in one or more non-transitory storage media.

In this example, the content extraction process is configured for producing, in block 410, a time-stamped phoneme sequence and pitch contour data corresponding to the first speech. In order to maintain consistent terminology, the time-stamped phoneme sequence produced in block 410 may be referred to herein as the "first time-stamped phoneme sequence" and the pitch contour data produced in block 410 may be referred to herein as the "first pitch contour data."

According to this implementation, block 405 involves receiving, by a neural network, the first time-stamped phoneme sequence and the first pitch contour data produced by the content extraction process. The neural network may be referred to herein as the "first neural network." The first neural network also may be referred to herein as a "conditioning network," because in some implementations the first neural network may pre-process or condition the first time-stamped phoneme sequence and the first pitch contour data before these data are provided to a voice modeling neural network.

Block 420 provides one example of how the first neural network may condition the first time-stamped phoneme sequence and the first pitch contour data. In this example, the first neural network is configured to produce first neural network output corresponding to the first time-stamped phoneme sequence and the first pitch contour data, wherein the first neural network output is produced at two or more (a "plurality") of frame sizes. The frame sizes of the first neural network output may, in some examples, correspond to suitable input frame sizes of a second neural network.

In some examples, the first neural network may process multiple frames before passing the first neural network output to the second neural network. However, in alternative implementations, the first neural network may not delay passing the first neural network output to the second neural network while multiple frames of the first neural network output are processed.

Accordingly, in this example block 425 involves receiving, by a second neural network implemented via the control system, the first neural network output. In this example, the second neural network includes a hierarchy of modules and each module operates at a different temporal resolution. The frame sizes of the first neural network output correspond to the temporal resolution of the modules of the second neural network. Some detailed examples are provided below.

According to this implementation, block 430 involves generating, by the second neural network, first predicted audio signals. In this example, block 435 involves comparing, via the control system, the first predicted audio signals to first test data and block 440 involves determining, via the control system, a loss function value for the first predicted audio signals. As will be appreciated by those of skill in the art, the loss function value may be used to train the second neural network. According to some implementations, the loss function value also may be used to train the first neural network.

According to some examples, training the second neural network (and in some instances, training the first neural network) may continue until the loss function is relatively "flat," such that the difference between a current loss function value and a prior loss function value (such as the previous loss function value) is at or below a threshold value. In the example shown in FIG. 4, block 445 involves repeating at least some of blocks 405 through 440 until a difference between a current loss function value for the first predicted audio signals and a prior loss function value for the first predicted audio signals is less than or equal to a predetermined value, for example 1.90, 1.92, 1.94, 1.96, 1.98, 2.00, etc. As described below, repeating some blocks (such as repeating block 420 and/or repeating block 430) may involve changing a physical state of at least one tangible storage medium location corresponding with at least one weight of the second neural network.

As noted above, providing identification data can allow one or more neural networks to be trained with speech from multiple target speakers. The processes described above with reference to FIG. 4 may be repeated for each target speaker and the training results may be saved and associated with identification data corresponding to each target speaker. Such training results may be used, e.g., for speech generation based on a selected target speaker.

Figure 5:
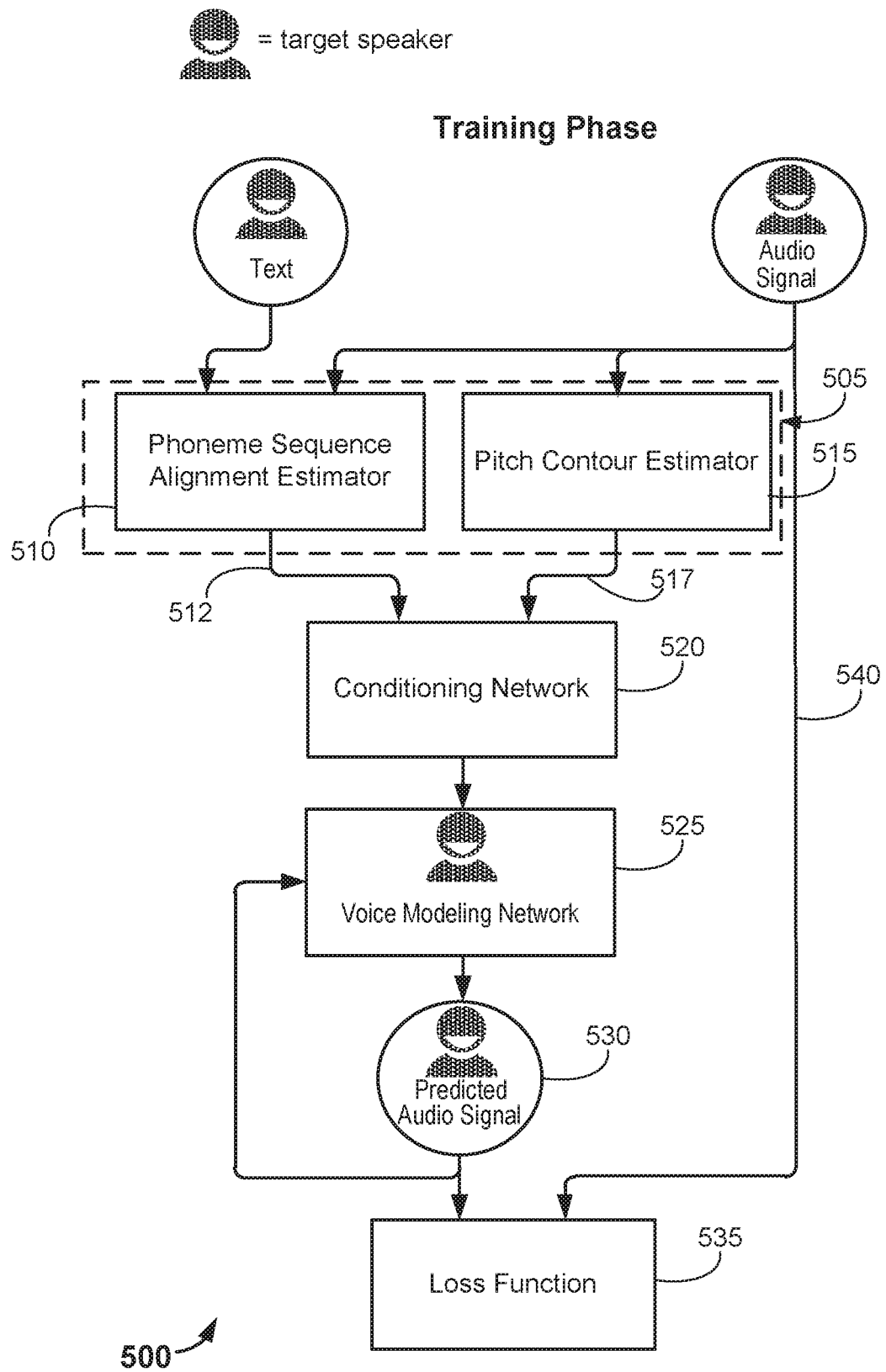
FIG. 5 shows blocks of a speech synthesizer training system according to some examples.

FIG. 5 shows blocks of a speech synthesizer training system according to some examples. System 500 may, in some instances, be performed by the apparatus of FIG. 3 or by another type of apparatus disclosed herein. In some examples, the blocks of system 500 may be implemented via software stored on one or more non-transitory media. Alternative implementations may include more or fewer blocks than shown and/or described.

Here, system 500 is configured for providing input audio data corresponding to speech of a target speaker to a content extraction block 505. The target speaker may, in some instances, correspond to the "first speech of the first person" referred to elsewhere herein. In some examples, the input audio data may be provided via an interface system such as the interface system 310 shown in FIG. 3 and described above. In some examples, the input audio data may be provided via microphone signals from contemporaneous speech of the target speaker. However, in other examples the input audio data may be provided via previously-recorded speech of the target speaker. In some such examples, the previously-recorded speech may have been recorded years or even decades prior to the time that the input audio data is provided to the content extraction block 505. For example, the previously-recorded speech may have been recorded during an earlier phase of a persons' career, e.g., during a specific period of time of an earlier phase of an actor's career, a musician's career, a politician's career, etc. Such previously-recorded speech may, for example, correspond to portions of a movie or television sound track, interview recordings, etc.

In this example, the content extraction block 505 includes a phoneme sequence alignment estimator block 510 and a pitch contour estimator block 515. In this example, the phoneme sequence alignment estimator block 510 receives the input audio data and text corresponding to the input audio data. The received text may, in some examples, include time stamps corresponding to times of the input audio data. According to some examples, the received text may include interview transcript text, script text, transcription text, etc. According to this example, the pitch contour estimator block 515 receives the input audio data, but not the text corresponding to the input audio data. In some examples, the content extraction block 505 may also receive identification data corresponding to the target speaker.

In this example, the phoneme sequence alignment estimator block 510 is configured for producing a time-stamped phoneme sequence 512 corresponding to the input audio data. In some implementations, the phoneme sequence alignment estimator block 510 may convert input audio data into mel-frequency cepstral coefficients (MFCCs), which are representations of the short-term power spectrum of a sound, based on a linear cosine transform of a log power spectrum on a nonlinear mel scale of frequency. The phoneme sequence alignment estimator block 510 may be configured for converting text to known phonemes by reference to a dictionary. The phoneme sequence alignment estimator block 510 may be configured for making alignments between the MFCC features and the phonemes. The phoneme sequence alignment estimator block 510 may, in some examples, be a forced aligner based on a speech recognition system, such as a Kaldi speech recognition system. However, other implementations may employ other types of speech recognition systems.

Here, the pitch contour estimator block 515 is configured for producing pitch contour data 517 corresponding to the input audio data. In some examples, the pitch contour data 517 may indicate, for each audio frame, a normalized log value of the pitch. In some examples, an audio frame may be 5 milliseconds (ms) in duration. However, alternative examples may implement smaller or larger audio frames, such as 4 ms frames, 6 ms frames, 8 ms frames, 10 ms frames, etc. According to some examples, the pitch contour estimator block 515 may be configured to generate, e.g., 200 floating numbers in sequence representing pitch absolute values. The pitch contour estimator block 515 may be configured to perform a log operation on these floating numbers and for normalizing the resulting values for each target speaker, so that the output is a contour around 0.0 (e.g., 0.5), instead of absolute pitch values (e.g., 200.0 Hz). In some examples, the pitch contour estimator block 515 may be configured to use speech temporal characteristics. According to some examples, the pitch contour estimator block 515 may first use several low-pass filters with different cutoff frequencies. In one example, a low-pass filter may have a cut-off frequency of 50 Hz, so that the will pass signals between 0 Hz and 50 Hz. Other implementations may have other cut-off frequencies. According to some such implementations, the cut-off frequencies of these low-pass filters may vary between 50 Hz and 500 Hz. If the filtered signals only consist of the fundamental frequency, the pitch contour estimator block 515 may form a sine wave. The fundamental frequency may be obtained based on the period of this sine wave. In some instances, the pitch contour estimator block 515 may use zero-crossings and peak dip intervals to choose the best fundamental frequency candidate. In some examples, the pitch contour estimator block 515 may include a pitch estimator such as the World pitch estimator that is provided on Github. However, in other examples the pitch contour estimator block 515 may include another type of pitch estimator.

In some examples, the content extraction block 505 is configured to output an indicator that indicates whether a current audio frame is voiced or unvoiced. According to some implementations, the content extraction block 505 is configured to output multiple phonemes, including a current phoneme, one or more of the most recent phonemes and one or more future phonemes (e.g., the next phoneme and possibly additional phonemes). According to one such example, the content extraction block 505 is configured to output five phonemes, including the current phoneme, the two previous phonemes and the two next phonemes.

According to this implementation, the time-stamped phoneme sequence 512 and the pitch contour data 517 are received by a conditioning neural network 520. The conditioning neural network 520 is an instance of the "first neural network" that is described above with reference to FIG. 4. In this example, the conditioning neural network 520 is configured to pre-process or condition the time-stamped phoneme sequence 512 and the pitch contour data 517 before these data are provided to the voice modeling neural network 525. In some examples, the voice modeling neural network 525 may include a plurality of modules, each module operating at a different rate or temporal resolution. The frame sizes output by the conditioning neural network 520 may correspond to the temporal resolution of the modules of the voice modeling neural network 525.

In this example the voice modeling neural network 525 is configured to generate a predicted audio signal 530 and to provide the predicted audio signal 530 to the loss function determining block 535. Here, the loss function determining block 535 is configured for comparing the predicted audio signals to test data 540 and for determining a loss function value for the predicted audio signals. According to this example, the test data 540 is audio data corresponding to speech of the target speaker. In some examples, the test data 540 includes audio data corresponding to speech of the target speaker that has not previously been provided to the content extraction block 505. In this example, the loss function value is used to train the voice modeling neural network 525. According to some implementations, the loss function value also may be used to train the conditioning neural network 520.

According to some examples, training the voice modeling neural network 525 (and in some instances, training the conditioning neural network 520) may continue until the loss function is relatively "flat," such that the difference between a current loss function value and a prior loss function value is at or below a threshold value. As described in more detail below, training the voice modeling neural network 525 may involve changing a physical state of tangible storage medium locations corresponding with weights and/or activation function values of the voice modeling neural network 525.

Figure 6:
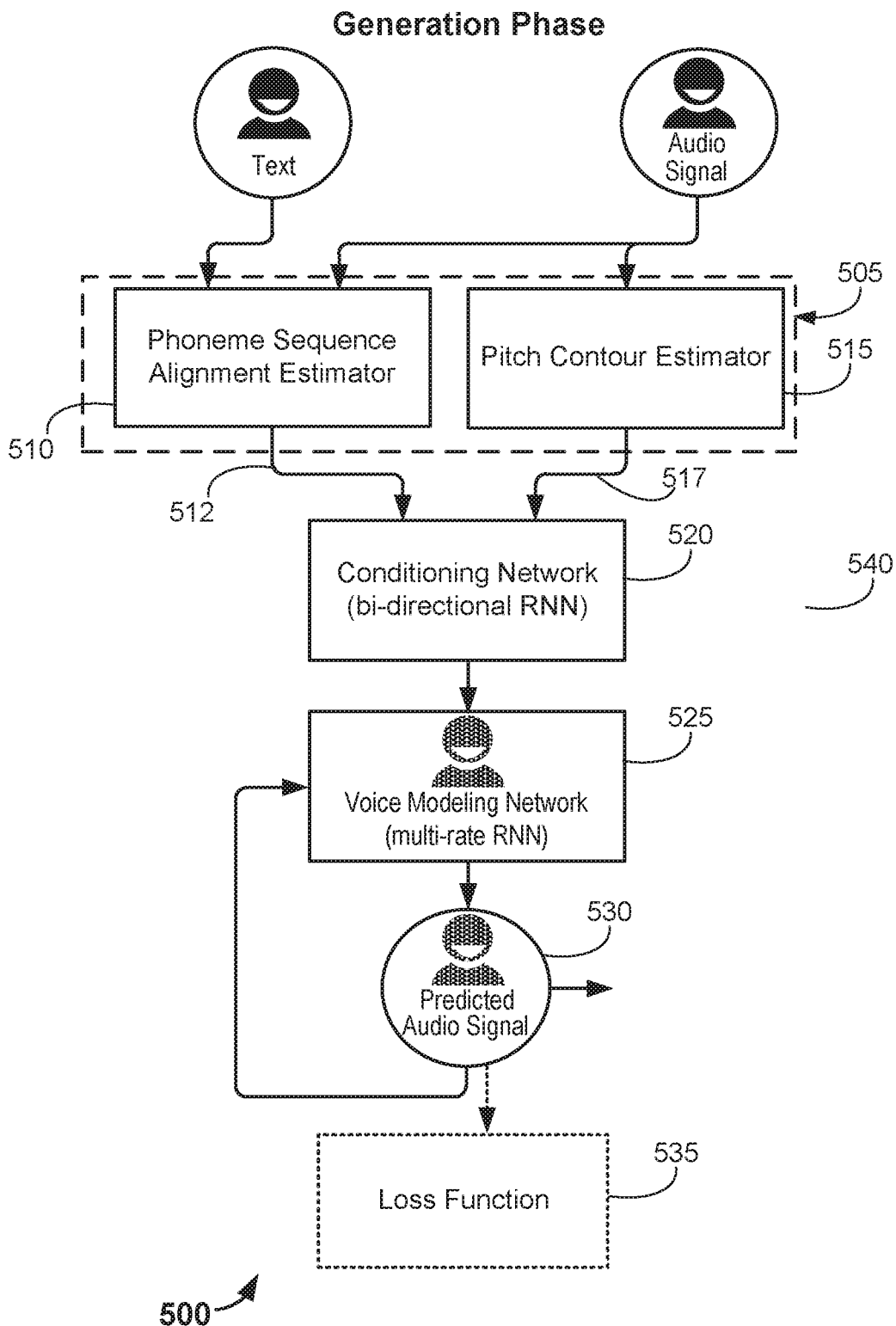
FIG. 6 shows an example of causing a trained speech synthesizer to generate synthesized audio data.

FIG. 6 shows an example of causing a trained speech synthesizer to generate synthesized audio data. In this example, the voice modeling neural network 525 has already been trained to synthesize audio data corresponding to the voice of the target speaker. According to this example, input audio data corresponding to speech of a source speaker is provided to the content extraction block 505. The speech of the source speaker may, in some instances, correspond to the "second speech of the second person" referred to elsewhere herein. However, in other examples the voice modeling neural network 525 may already have been trained to synthesize audio data corresponding to the voice of the target speaker when the speaker was at a first age, or during a time in which the speaker was in a range of ages (e.g., 21 through 25 years of age, 26 through 30 years of age, etc.) that includes the first age. According to some such examples, the speech of the source speaker may correspond to speech of the target speaker during a time at which the target speaker was a different age, e.g., when the target speaker was older.

In this example, the phoneme sequence alignment estimator block 510 receives the input audio data and text corresponding to the input audio data, and the pitch contour estimator block 515 receives the input audio data, but not the text corresponding to the input audio data. The received text may include time stamps corresponding to times of the input audio data. Although the input audio data now corresponds to the source speaker, in some implementations the content extraction block 505 receives identification data corresponding to the target speaker. In some implementations wherein the source speaker and the target speaker are the same person at different ages, identification data for the target speaker at the desired age, or age range, may be provided to block 505. In one simple example, the speech of speaker A at a first age (or range of ages) may be designated A1 and the speech of speaker A at a second age (or range of ages) may be designated A2. Therefore, in such examples the system 500 will generate synthesized audio data that corresponds to words uttered by the source speaker according to speech characteristics of the target speaker.

In this example, the phoneme sequence alignment estimator block 510 is configured for producing a time-stamped phoneme sequence 512 corresponding to the input audio data from the source speaker. Here, the pitch contour estimator block 515 is configured for producing pitch contour data 517 corresponding to the input audio data from the source speaker.

According to this implementation, the conditioning neural network 520 is configured to pre-process or condition the time-stamped phoneme sequence 512 and the pitch contour data 517 before conditioned versions of these data (which are examples of the "first neural network output" referenced elsewhere herein) are provided to the voice modeling neural network 525.

In this example, in addition to receiving the conditioned versions of the time-stamped phoneme sequence 512 and the pitch contour data 517 corresponding to the input audio data from the source speaker, the voice modeling neural network 525 also receives the identification data corresponding to the target speaker. Accordingly, in this example the voice modeling neural network 525 is configured to generate a predicted audio signal 530 (a/k/a "synthesized audio data") that includes synthesized audio data corresponding to the first neural network output and the first identification data. In such instances, the synthesized audio data corresponds to words uttered by the source speaker according to speech characteristics of the target speaker. According to some examples wherein the training process involves receiving the audio data corresponding to the target speaker in a first language, the synthesized audio data may correspond to words uttered by the source speaker in a second language.

Although in this example the voice modeling neural network 525 has already been trained to synthesize speech corresponding to that of the target speaker, in some implementations the predicted audio signal 530 may be evaluated and refined before it is output for storage, for reproduction via one or more transducers, etc. In some such implementations the predicted audio signal 530 may be provided to the loss function determining block 535. The loss function determining block 535 may comparing the predicted audio signal 530 to test data and may determine a loss function value for the predicted audio signal 530. The loss function value may be used to further refine the predicted audio signal 530. According to some implementations, the loss function value also may be used to train the conditioning neural network 520.

According to some implementations, the first neural network and/or the second neural network may be a recurrent neural network. As known by those of skill in the art, a recurrent neural network is a class of neural network in which connections between the individual units or "neurons" form a directed cycle. This feature allows recurrent neural networks to exhibit dynamic temporal behavior. Unlike feedforward neural networks, recurrent neural networks can use their internal memory to process arbitrary sequences of inputs. This capability makes recurrent neural networks applicable to tasks such as handwriting recognition or speech recognition.

Basic recurrent neural networks include a network of nodes, which are often referred to as "neurons." Each neuron has a directed (one-way) connection to other neurons. Each neuron has a time-varying real-valued activation function, commonly referred to as an "activation," which defines the output of that neuron given an input or set of inputs. Each connection (also referred to as a "synapse") between neurons has a modifiable real-valued weight. A neuron may be an input neuron (receiving data from outside the network), an output neuron, or a hidden neuron that modifies the data en route from an input neuron to an output neuron. Some recurrent neural networks may include several layers of hidden neurons between a layer of input neurons and a layer of output neurons.

A neural network may be implemented by a control system such as the control system 315 that is described above with reference to FIG. 3. Accordingly, for implementations wherein the first neural network or the second neural network is a recurrent neural network, training the first neural network or the second neural network may involve changing the physical state of non-transitory storage medium locations corresponding to the weights in the recurrent neural network. The storage medium locations may be parts of one or more storage media that are accessible by, or part of, the control system. The weights, as noted above, correspond to connections between neurons. Training the first neural network or the second neural network also may involve changing the physical state of non-transitory storage medium locations corresponding to the values of the neurons' activation functions.

The first neural network may, in some examples, be a bi-directional recurrent neural network. With a standard recurrent neural network, input corresponding to a future time cannot be reached from the current state. In contrast, bi-directional recurrent neural networks do not require their input data to be fixed. Moreover, the future input information of bi-directional recurrent neural networks is reachable from the current state. A fundamental process of bi-directional recurrent neural networks is connecting two hidden layers, corresponding to opposite time directions, to the same input and output. By implementing this type of structure, neurons in the output layer of a bi-directional recurrent neural network can receive information from past and future states. Bi-directional recurrent neural networks are particularly useful when the context of the input is needed. For example, in handwriting recognition applications, performance may be enhanced by knowledge of the letters located before and after the current letter.

Figure 7:
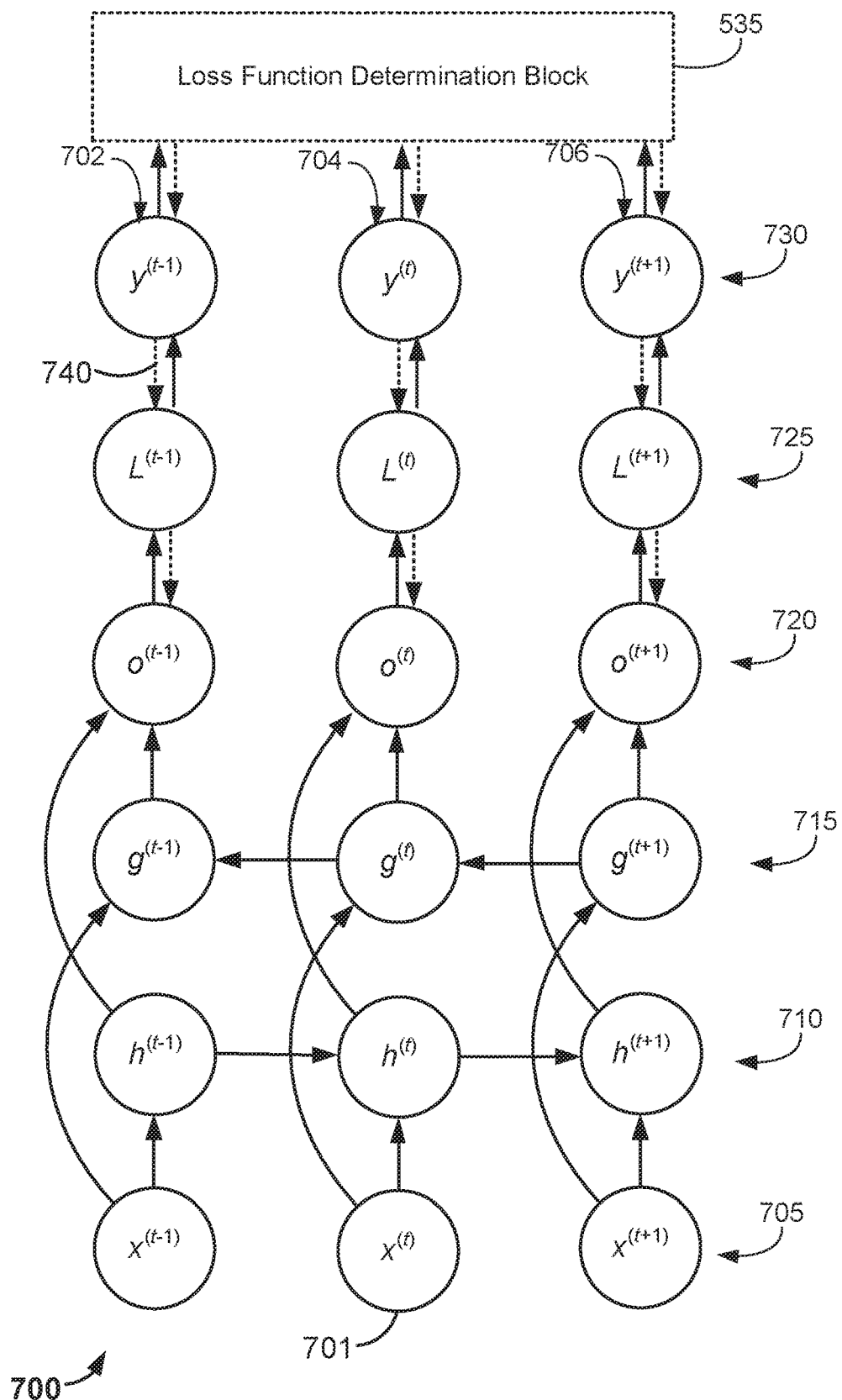
FIG. 7 shows one example of a bi-directional recurrent neural network.

FIG. 7 shows one example of a bi-directional recurrent neural network. The number of layers, the number of neurons in each layer, etc., that are shown in FIG. 7 are merely examples: other implementations may include more or fewer layers, neurons in each layer, etc.

In FIG. 7, the neurons 701 are represented as circles. The "x" neurons of layer 705 are input neurons, which are configured for receiving data from outside the bi-directional recurrent neural network 700. The "y" neurons of layer 730 are output neurons, which are configured for outputting data from the bi-directional recurrent neural network 700. The neurons in layers 710-725 are hidden neurons that modify the data en route from an input neuron to an output neuron. In some implementations, the neurons of the bi-directional recurrent neural network 700 may employ sigmoidal activation functions, tan h activation functions, or both sigmoidal and tan h activation functions. Although four hidden layers are shown in FIG. 7, some implementations may include more or fewer hidden layers. Some implementations may include many more hidden layers, e.g., hundreds or thousands of hidden layers. For example, some implementations may include 128, 256, 512, 1024, 2048 or more hidden layers.

In this example, the bi-directional recurrent neural network 700 includes three columns of neurons, each of which corresponds to a different time. The times may, for example, correspond to a time interval at which input data are provided to the bi-directional recurrent neural network 700. The central column 704 corresponds to a time t, the left column 702 corresponds to a time t−1 and the right column 706 corresponds to a time t+1. The time t−1 may, for example, correspond with a data sample taken at a time immediately prior to time t and the time t+1 may correspond with a data sample taken at a time immediately after time t.

In this example, hidden layers 710 and 715 correspond to opposite time directions. The neurons 701 of the hidden layer 710 pass data forward in time, whereas the neurons 701 of the hidden layer 715 pass data backward in time. However, the hidden layer 710 does not provide input to the hidden layer 715 and the hidden layer 715 does not provide input to the hidden layer 710.

The input neurons of layer 705 corresponding to a particular time—such as the input neurons in column 704, corresponding to time t—provide information to the neurons of hidden layer 710 and the neurons of hidden layer 715 corresponding to the same time. The neurons of hidden layer 710 and the neurons of hidden layer 715 provide information to a single neuron of the layer 720 corresponding to the same time.

Although the information and processing flow of neural networks proceeds from the input neurons to the output neurons, FIG. 7 also illustrates "backward propagation" (also known as "backpropagation") in the opposite direction, as depicted by the stippled arrows 740. Backpropagation is a method used in neural networks to calculate the error contribution of each neuron after a batch of data is processed. Backpropagation may involve applying a gradient descent optimization algorithm to adjust the weight of neurons by calculating the gradient of the loss function.

In the example shown in FIG. 7, the output neurons of layer 730 may provide output to the loss function determination block, which may provide a current loss function value to the output neurons of layer 730. The backpropagation technique is also sometimes called backward propagation of errors, because the error may be calculated at the output and distributed back through the neural network layers as shown by the stippled arrows 740.

Although in this example backpropagation has been illustrated and described in the context of a bi-directional recurrent neural network, backpropagation techniques may be applied in other types of neural networks, including but not limited to other types of recurrent neural networks. For example, backpropagation techniques may be applied to the voice modeling neural network ("the second neural network"), to the autoencoder and/or to the speech classifier neural network described elsewhere herein.

Figure 8:
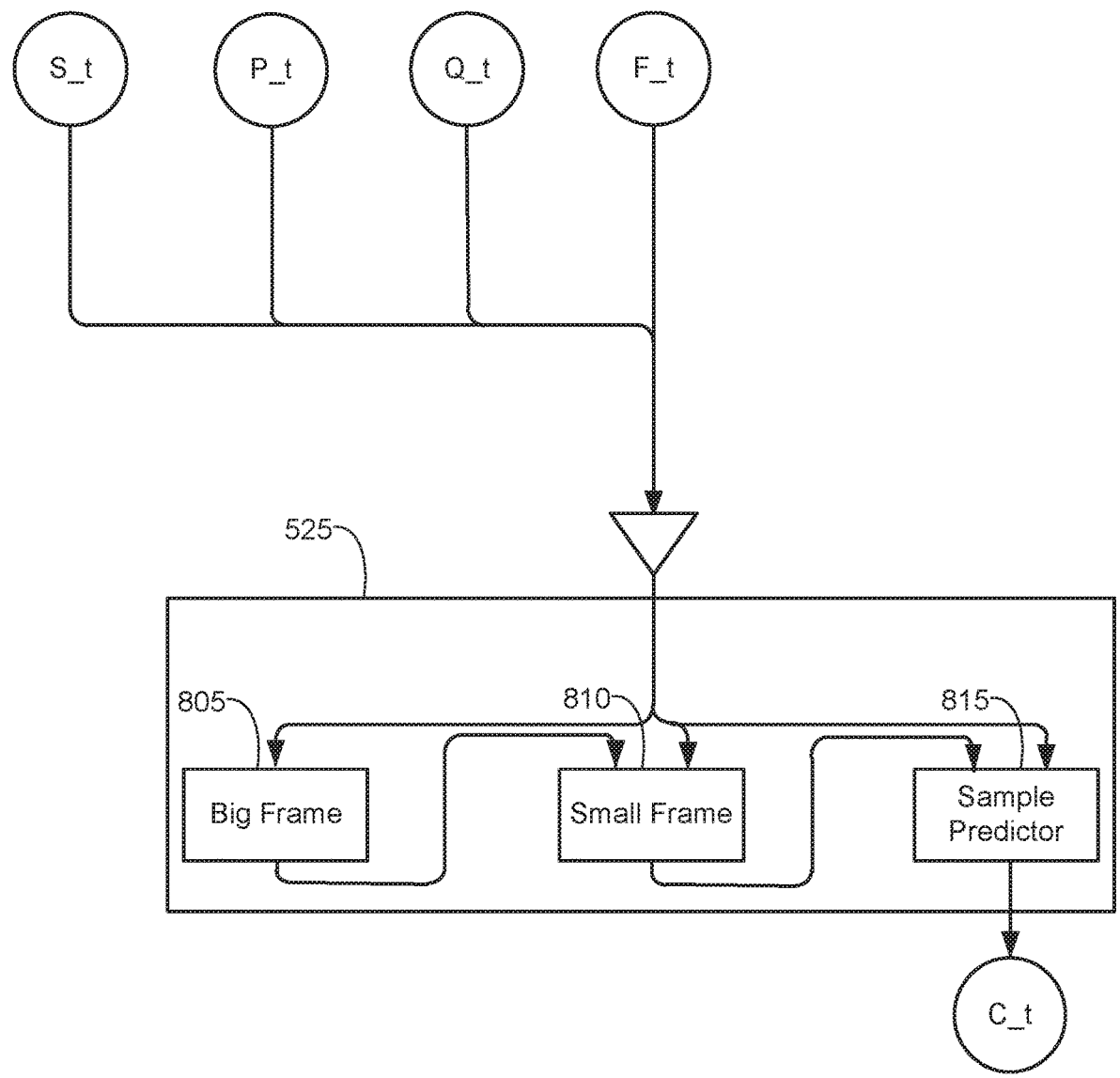
FIG. 8 shows example blocks of a voice modeling neural network and examples of inputs that may be provided to the voice modeling neural network during training.

FIG. 8 shows example blocks of a voice modeling neural network and examples of inputs that may be provided to the voice modeling neural network during training. According to some examples, neurons of the voice modeling neural network 525 may employ sigmoidal activation functions and/or tan h activation functions. Alternatively, or additionally, neurons of the voice modeling neural network 525 may employ rectified linear unit (ReLU) activation functions. In this example, $S\_t$, $P\_t$, $Q\_t$ and $F\_t$ are provided to the voice modeling neural network 525. Here, $S\_t$ represents the target speaker identification data, $P\_t$ represents the previous predicted audio signals that were generated by the voice modeling neural network 525 for the target speaker, $Q\_t$ represents an input time-aligned phoneme sequence corresponding to the target speaker's voice and $F\_t$ represents fundamental frequency contour data corresponding to the target speaker's voice.

In this example, the voice modeling neural network 525 includes modules 805, 810 and 815, each of which operates at a different temporal resolution. In this example, the module 805 processes more samples per frame than module 810 and the module 815 processes more samples per frame than module 805. In some such examples, the module 805 processes ten times more samples per frame than module 810 and the module 815 processes eighty times more samples per frame than module 810. According to some such implementations, the voice modeling neural network 525 may comprise a modified version of a SampleRNN neural network as described above. The SampleRNN neural network may, for example, be modified to be trained for multiple target speakers and to generate synthesized audio data corresponding to a selected one of the multiple target speakers. However, these are merely examples. In other implementations, the voice modeling neural network 525 may include a different numbers of modules and/or the modules may be configured to process different frame sizes.

Accordingly, input data of different frame sizes may be input to the voice modeling neural network 525, e.g., by the conditioning neural network 520 (not shown in FIG. 8). In one such example, the audio data is sampled at 16 KHz, so the conditioning neural network 520 may provide 80 samples (the "big frame" size), equaling 5 ms of audio data, for each frame of the module 805. In one such implementation, the conditioning neural network 520 may provide 8 samples (the "small frame" size) equaling 0.5 ms of audio data, for each frame of the module 810. According to one such implementation, the conditioning neural network 520 may provide 640 samples (the "sample predictor" frame size), equaling 40 ms of audio data, for each frame of the module 815. According to some such examples, the module 810 may be operating ten times faster than the module 805 and 80 times faster than the module 815.

In some implementations, the conditioning neural network 520 may simply repeat the same 8 samples provided to the module 810 ten times, to produce 80 samples for input to the module 805. According to some such implementations, the conditioning neural network 520 may repeat the same 8 samples provided to the module 810 eighty times, to produce 640 samples for input to the module 815. However, in alternative implementations the conditioning neural network 520 may provide input to the voice modeling neural network 525 according to other methods. For example, the input audio data may be sampled at a frequency other than 16 KHz, the modules 805, 810 and 815 may operate on different frame sizes, etc. In one alternative implementation, the module 805 may receive 20 samples per frame and the module 815 may use the prior 20 samples as history. Some detailed examples of the modules 805, 810 and 815 are described below with reference to FIG. 14.

In this example, $C\_t$ represents the synthesized audio data that is output by the voice modeling neural network 525 for the current target speaker. Although not shown in FIG. 8, in many implementations the training process would involve providing $C\_t$ to a loss function determination block, receiving a loss function value from the loss function determination block and training at least the voice modeling neural network 525 according to the loss function value. Some implementations also involve training the conditioning neural network according to the loss function value.

Figure 9:
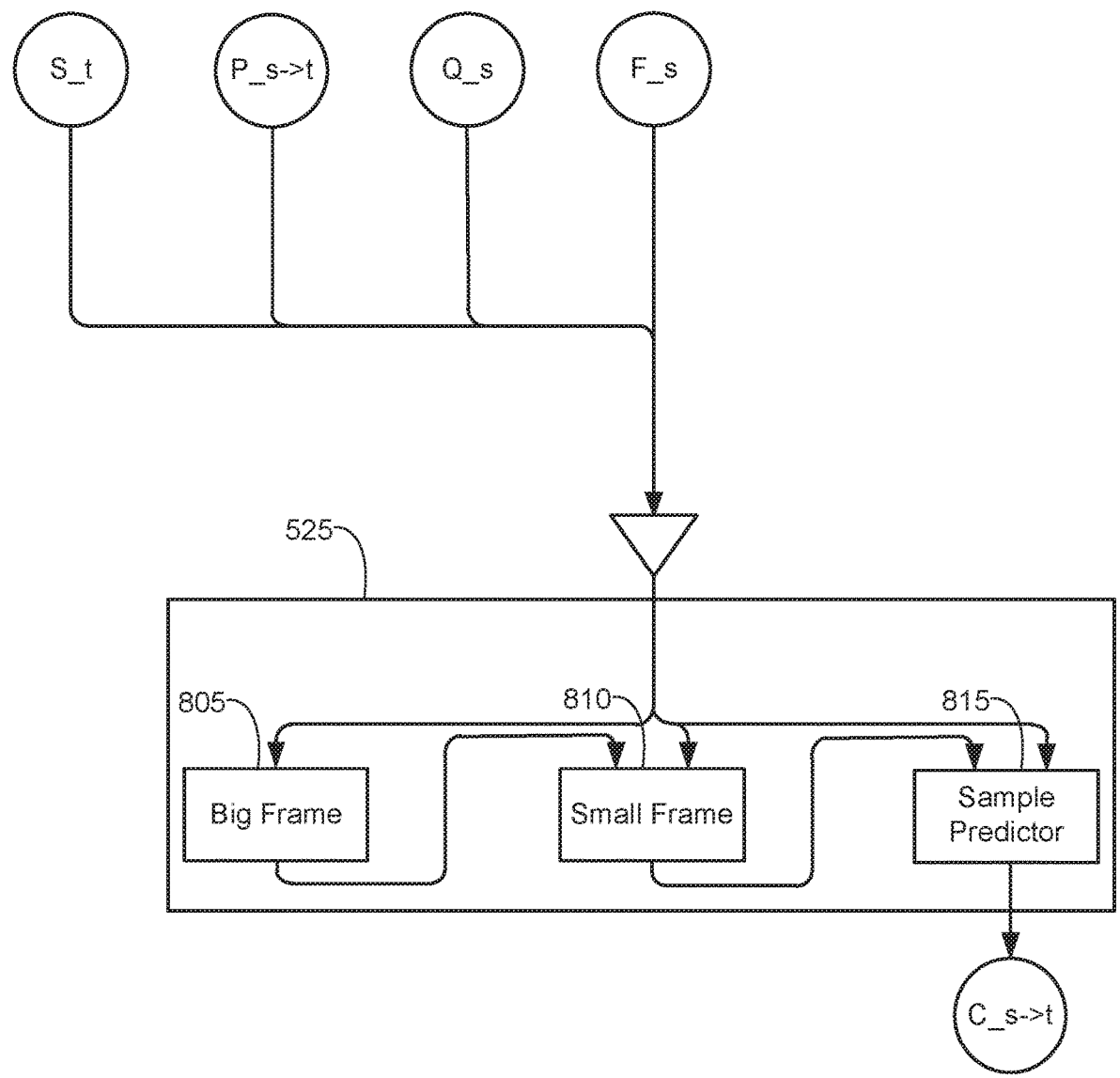
FIG. 9 shows example blocks of a voice modeling neural network and examples of inputs that may be provided to the voice modeling neural network during a speech generation process.

FIG. 9 shows example blocks of a voice modeling neural network and examples of inputs that may be provided to the voice modeling neural network during a speech generation process. In this example, S_t, P_s→t, Q_s and F_s are provided to the voice modeling neural network 525. Here, S_t represents the target speaker identification data, P_s→t represents the previous predicted (source-to-target style-transferred) audio signals that were generated by the voice modeling neural network 525, Q_s represents an input time-aligned phoneme sequence corresponding to the source speaker's voice and F_s represents fundamental frequency contour data corresponding to the source speaker's voice.

As described above with reference to FIG. 8, the voice modeling neural network 525 includes modules 805, 810 and 815 in this example, each of which operates at a different temporal resolution. Accordingly, input data of different frame sizes may be input to the voice modeling neural network 525, for example by the conditioning neural network 520 (not shown in FIG. 9).

Some implementations may involve one or more additional neural networks. In some such implementations, a third neural network may receive the input audio data (such as the "first speech" described above with reference to FIG. 4) during a training process. The training process may involve training the third neural network to determine first speech characteristics corresponding to speech of the first person and to output encoded audio data.

According to some such examples, the third neural network may be, or may include, an autoencoder. An autoencoder is a neural network that may be used for unsupervised learning of efficient coding. Generally speaking, the goal of an autoencoder is to learn a representation or "encoding" for a set of data, typically for the purpose of dimensionality reduction.

Figure 10:
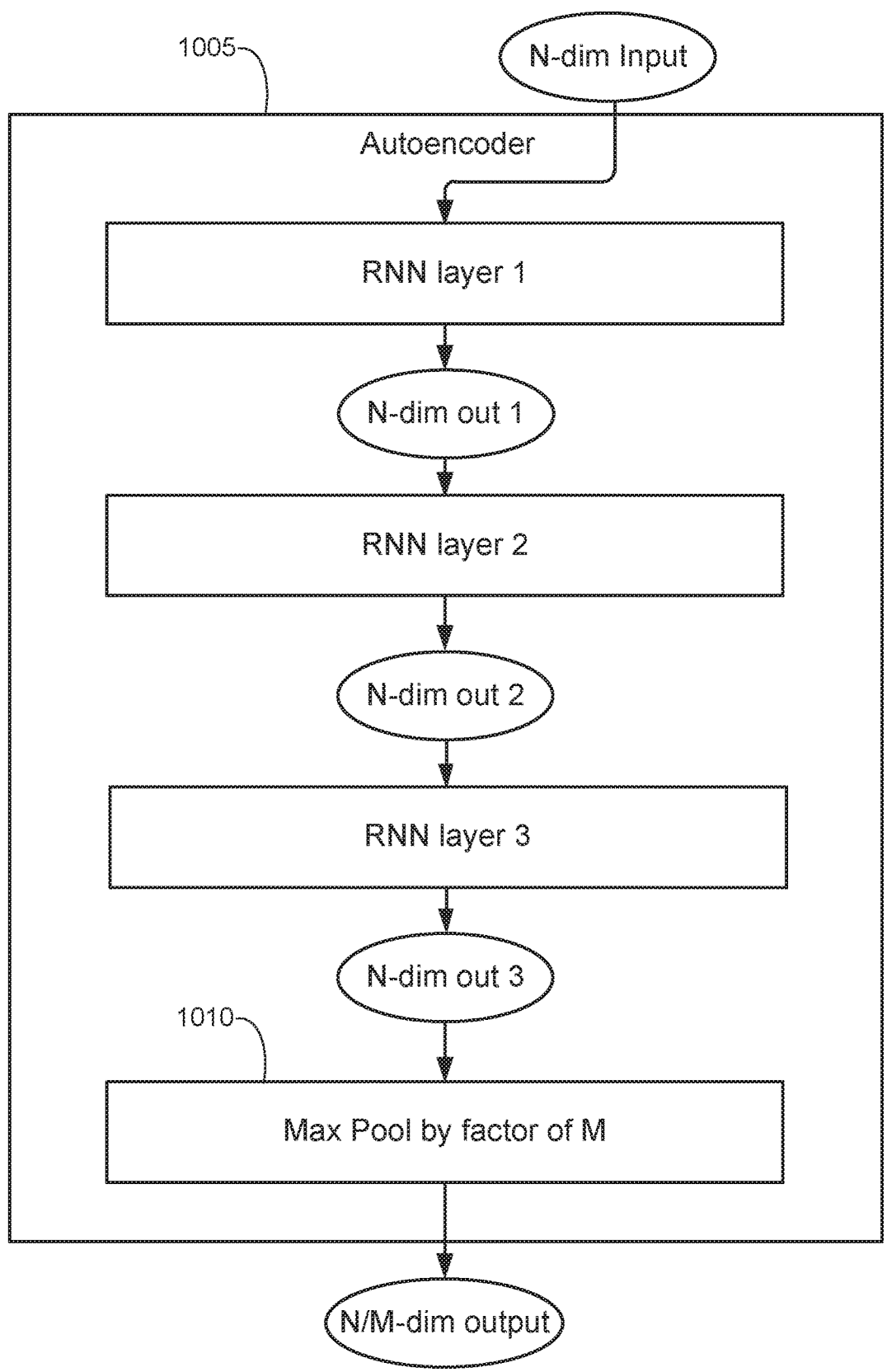
FIG. 10 shows an example of blocks of an autoencoder.

FIG. 10 shows an example of blocks of an autoencoder. The autoencoder 1005 may, for example, be implemented by a control system such as the control system 315 that is described above with reference to FIG. 3. The autoencoder 1005 may, for example, be implemented by one or more processors of the control system according to software stored in one or more non-transitory storage media. The numbers and types of elements shown in FIG. 10 are merely examples. Other implementations of the autoencoder 1005 may include more, fewer or different elements.

In this example, the autoencoder 1005 includes a recurrent neural network (RNN) having three layers of neurons. According to some examples, neurons of the autoencoder 1005 may employ sigmoidal activation functions and/or tan h activation functions. The neurons in RNN layers 1-3 process the N-dimensional input data while maintain its N-dimensional state. The layer 1010 is configured to receive the output of RNN layer 3 and apply a pooling algorithm. Pooling is a form of non-linear down-sampling. According to this example, the layer 1010 is configured to apply a max pooling function that partitions the output of RNN layer 3 into a set of M non-overlapping portions or "sub-regions" and, for each such sub-region, outputs the maximum value.

Figure 11:
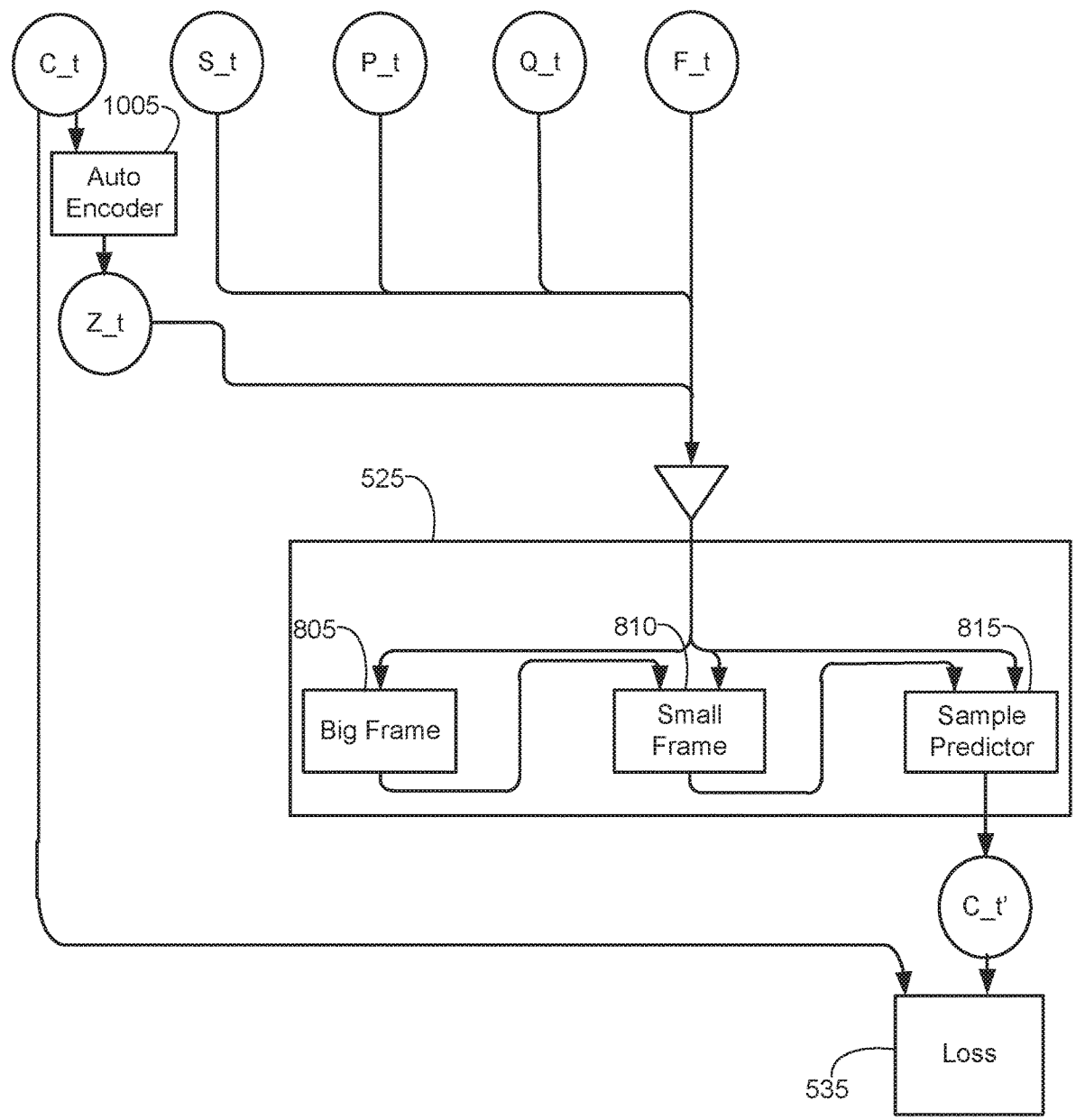
FIG. 11 shows example blocks for a process of training a speech synthesizer that includes an autoencoder.

FIG. 11 shows example blocks for a process of training a speech synthesizer that includes an autoencoder. In this example, most aspects of the training process may be implemented as described above with reference to FIG. 8. The values of S_t, F_t, Q_t and P_t are as described above with reference to FIG. 8.

However, in this example the autoencoder 1005 also provides input to the voice modeling neural network 525. According to this example, the autoencoder 1005 receives input audio data C_t from the target speaker during the training process and outputs Z_t to the voice modeling neural network 525. In this implementation, Z_t includes encoded audio data that is reduced in dimension as compared to the input audio data C_t.

In this example, C_t' represents the synthesized audio data that is output by the voice modeling neural network 525 for the current target speaker. In this implementation, the training process involves providing C_t' and "ground truth" audio data—which is the input audio data C_t in this example—to the loss function determination block 535, receiving a loss function value from the loss function determination block and training at least the voice modeling neural network 525 according to the loss function value. This example also involves training the autoencoder 1005 according to the loss function value. In order to avoid unnecessary clutter, FIG. 10 does not include arrows indicating the loss function value being provided to the voice modeling neural network 525 and the autoencoder 1005 by the loss function determination block 535. Some implementations also involve training the conditioning neural network according to the loss function value. In all cases, the training process involves changing a physical state of at least one tangible storage medium location corresponding with at least one weight of the neural network being trained.

In some such examples, the training also may involve training a fourth neural network to determine whether the encoded audio data generated by the third neural network corresponds to speech of the first person. The fourth neural network may be referred to herein as a "speaker identity classifier" or simply as a "speaker classifier." In some such implementations, the speech generation process may involve receiving, by the third neural network, audio data corresponding to speech of a source speaker. The source speaker may, in some instances, correspond to the "second person" referred to elsewhere herein (e.g., in the description of FIG. 6). Therefore, the received audio data may correspond with the "second audio data corresponding to second speech of the second person" referenced elsewhere herein.

In some such examples, the speech generation process may involve generating, by the third neural network, second encoded audio data corresponding to the second audio data. The speech generation process may involve receiving, by the fourth neural network, the second encoded audio data. In some examples, the speech generation process may involve generating modified second encoded audio data via an iterative process until the fourth neural network determines that the modified second encoded audio data corresponds to speech of the first person and, after the fourth neural network determines that the modified second encoded audio data corresponds to speech of the first person, providing the modified second encoded audio data to the second neural network (e.g., to the voice modeling neural network 525).

Figure 12A:
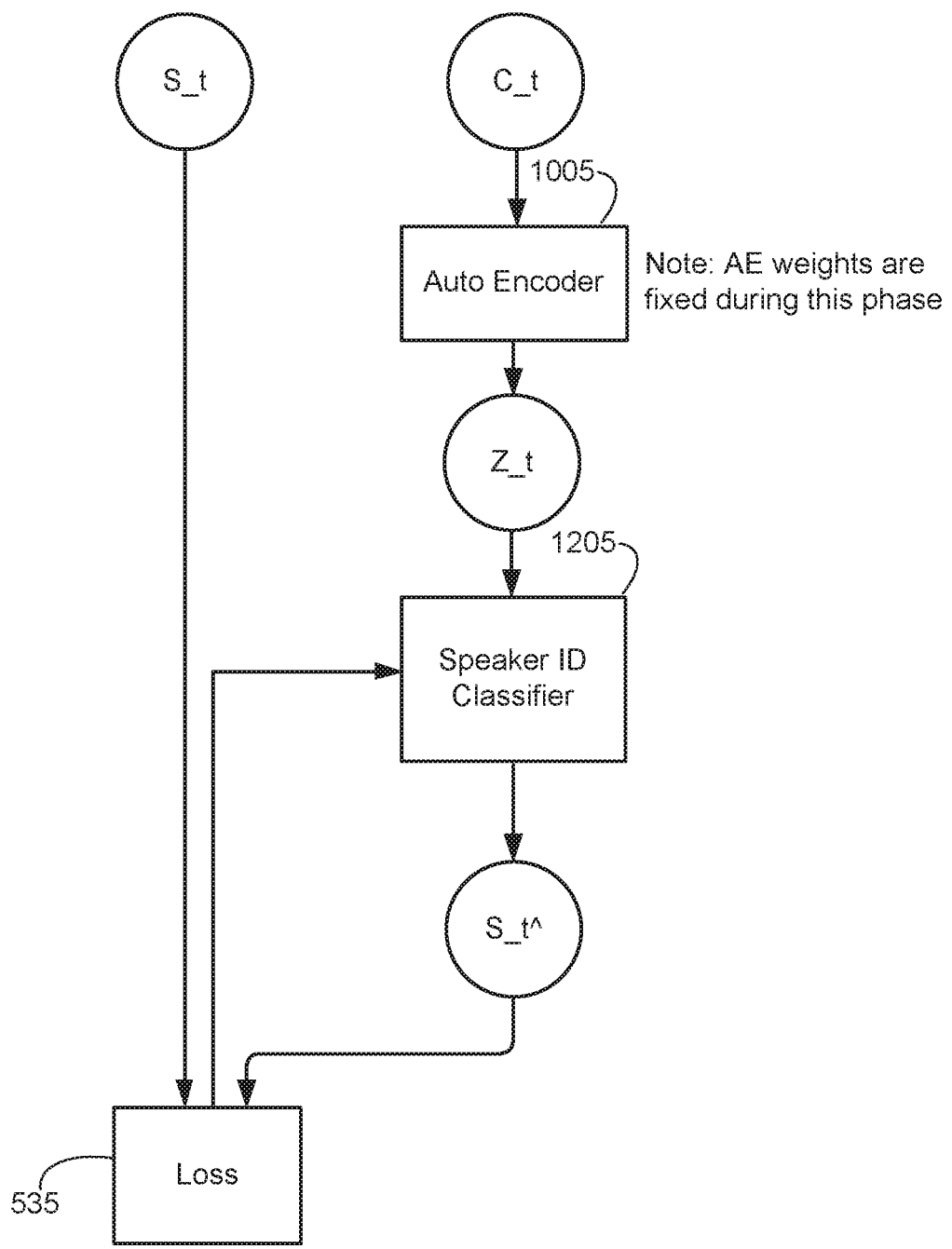
FIG. 12A illustrates examples of blocks that may be used during a process of training a speaker classifier.
Figure 12B:
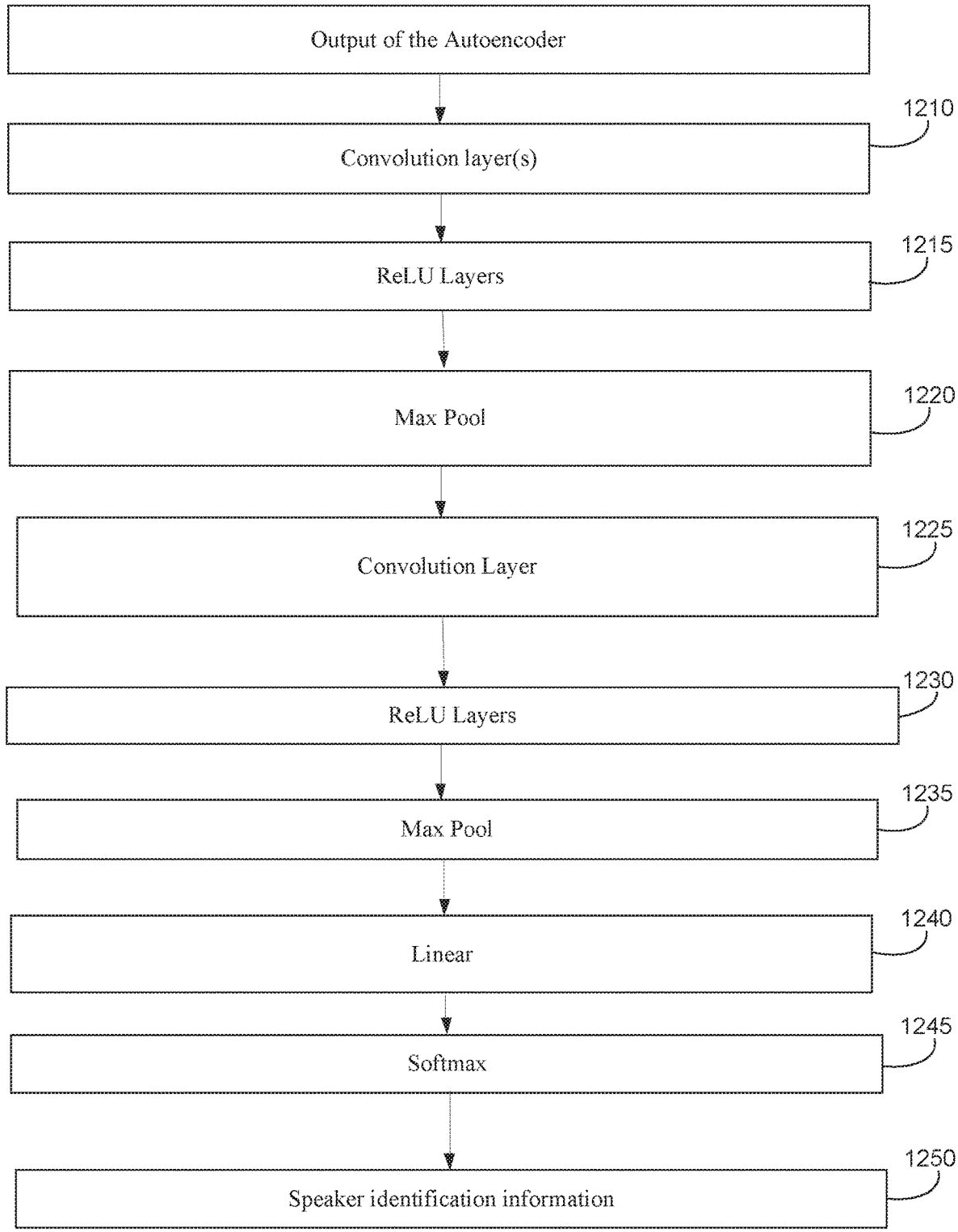
FIG. 12B illustrates one example of a speaker classifier.

FIG. 12A illustrates examples of blocks that may be used during a process of training a speaker classifier. In this example, the speaker classifier 1205 is a type of neural network and is trained according to input from the autoencoder 1005 and feedback from the loss function determination block 535. A more detailed example of the speaker classifier 1205 is illustrated in FIG. 12B and is described below. According to this implementation, at the time that the speaker classifier 1205 is being trained, the autoencoder 1005 has already been trained and the weights of the autoencoder 1005 are fixed.

According to this example, the autoencoder 1005 receives input audio data C_t from the target speaker during the training process and outputs Z_t to the speaker classifier 1205. In this implementation, Z_t includes encoded audio data that is reduced in dimension as compared to the input audio data C_t.

According to this implementation, the speaker classifier 1205 outputs S_t^, which is a predicted speaker identification data for the target speaker, to the loss function determination block 535. In this example, S_t, the "ground truth" speaker identification data for the target speaker, is also input to the loss function determination block 535.

The type and quantity of data that is included in the "speaker identification data" may vary according to the particular implementation. In a simple case, the speaker identification data may simply indicate the identity of a particular speaker (e.g., "speaker A"). In some such instances, the speaker classifier 1205 may simply be trained to determine, e.g., whether a speaker is speaker A or is not speaker A. According to some such implementations the speaker classifier 1205 may, for example, be trained until the loss function determination block 535 determines that S_t^ matches S_t.

However, in some implementations, the speaker identification data may be more complex. According to some such implementations, the speaker identification data may indicate speech characteristics of the target speaker that have been learned by the speaker classifier 1205 and/or by the autoencoder 1005. In some such implementations, the speaker identification data may be a multi-dimensional vector that represents speech characteristics of the target speaker. In some implementations, the dimensionality of the vector may be 8, 16, 32, 64 or 128. According to some such implementations, the speaker classifier 1205 may be trained until the loss function determination block 535 determines that the difference between S_t^ and S_t is at or below a threshold value. The training process involves changing a physical state of at least one tangible storage medium location corresponding with at least one weight of the speaker classifier 1205.

FIG. 12B illustrates one example of a speaker classifier. In this example, the speaker classifier 1205 includes a convolutional neural network. According to this example, the speaker classifier 1205 receives the output of the autoencoder 1005 as input and makes speaker classifications based on this input. In some examples, the input to the speaker classifier 1205 includes M×N features, wherein N is a number of input frames and M is a feature dimension.

In this example, the convolution layer 1210 includes 64 filters. However in other implementations the convolution layer 1210 may include a different number of filters, such as 30 filters, 40 filters, 50 filters, 60 filters, 70 filters, 80 filters, 90 filters, 100 filters, etc. Here, each filter kernel has a 16×1 filter size. According to this example, the convolution layer 1210 performs convolution operations with a step size or "stride" of 4. The stride indicates how many features are traversed when sliding the filters. Accordingly, sliding filters along the input data is the type of convolution operation that the convolution layer 1210 performs in this example. Given the M×N input in this example, we have an output size of C1×floor((N−16)/4+1), wherein floor(x) represents an operation that takes the largest integer i, such that i≤x.

According to this implementation, the neural network layers 1215 receive output from the convolution layer 1210 and apply ReLU activation functions. Here, the max pool block 1220 applies max pool operations to the output of the neural network layers 1215. In this example, the max pool block 1220 reduces the dimensionality of the output of the neural network layers 1215 by taking the maximum value from every 8 features. Here, the max pool block 1220 has an 8×1 kernel size and applies a stride of 8.

In this example, the convolution layer 1225 includes 100 filters. However in other implementations the convolution layer 1225 may include a different number of filters, such as 30 filters, 40 filters, 50 filters, 60 filters, 70 filters, 80 filters, 90 filters, 110 filters, 120 filters, 130 filters, etc. Here, each filter kernel has a 5×1 filter size. According to this example, the convolution layer 1225 performs convolution operations with a step size or "stride" of 1.

According to this implementation, the neural network layers 1230 receive output from the convolution layer 1225 and apply ReLU activation functions. Here, the max pool block 1235 applies max pool operations to the output of the neural network layers 1230. In this example, the max pool block 1235 reduces the dimensionality of the output of the neural network layers 1230 by taking the maximum value from every 6 features. Here, the max pool block 1220 has a 6×1 kernel size and applies a stride of 1.

In this example, the linear layer 1240 receives the output of the max pool block 1235 and applies a linear transformation through matrix multiplication. According to one such example, the linear layer 1240 applies a linear transformation according to:

$$y = Ax + b \quad \text{(Equation 1)}$$

In Equation 1, x represents the input, A represents a learnable weight matrix and b represents a learnable bias. According to this implementation, layer 1245 applies a softmax function to the output of the linear layer 1240. A softmax function, which is also known as a normalized exponential function, is a generalization of a logistic function that reduces a K-dimensional vector z of arbitrary real values to a K-dimensional vector σ(z) of real values in the range [0, 1] that add up to 1.

The output 1250 of the speaker classifier 1205 is speaker identification information. According to this example, the output 1250 includes a speaker classification probability distribution for each speaker identity class of a total number of speaker identity classes. For example, the output 1250 may include a probability of P1 that the speaker was Speaker A, a probability of P2 that the speaker was Speaker B, etc.

Figure 13:
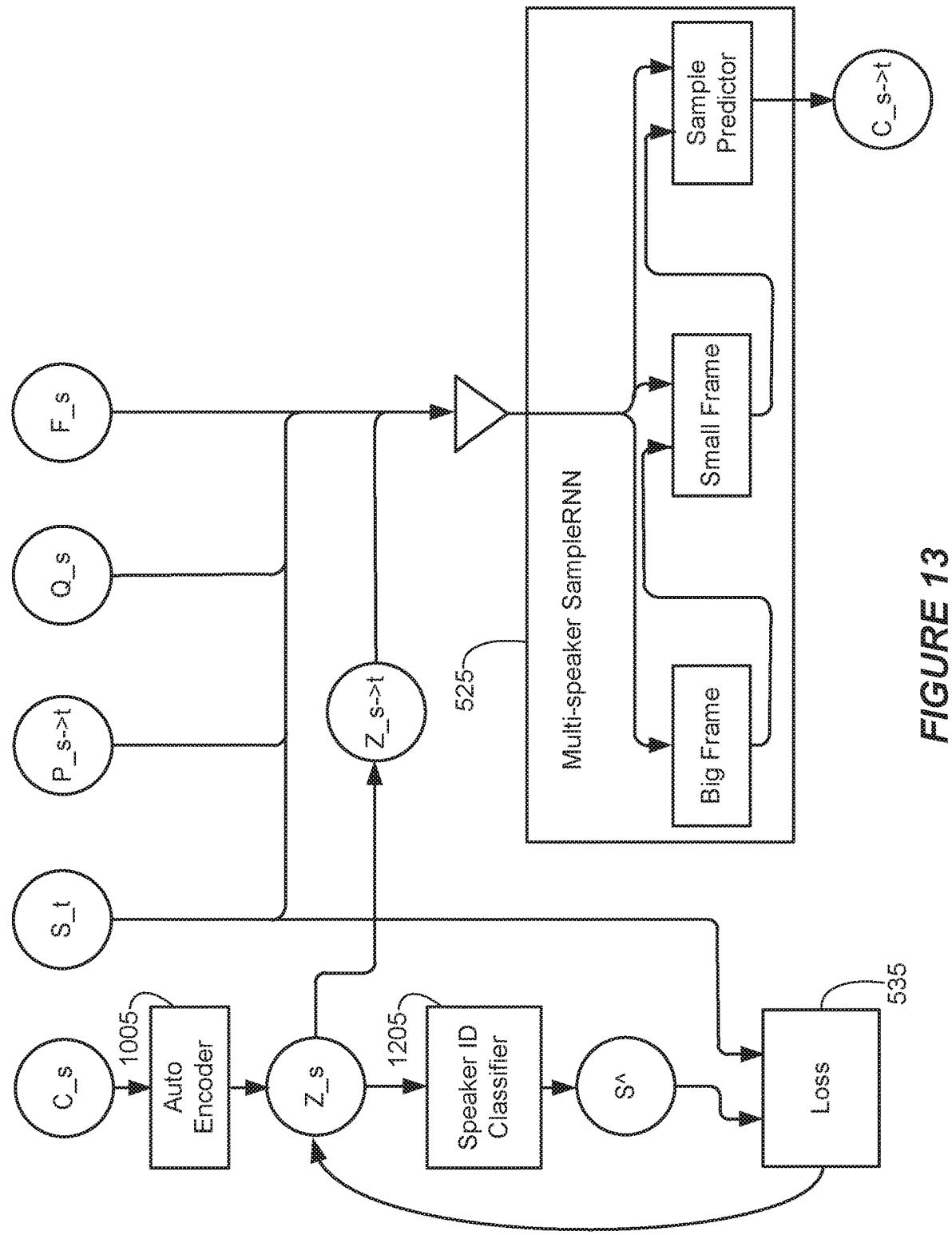
FIG. 13 provides an example of using a speaker classifier and an autoencoder for speech synthesis.

FIG. 13 provides an example of using a speaker classifier and an autoencoder for speech synthesis. Some aspects of this process, including what C_s, S_t, P_s→t and F_s represent, are described above (e.g., with reference to FIG. 9) and will not be repeated here. In this example, C_s represents the input audio data for the source speaker that is provided to the autoencoder 1005. Z_s represents the output of the autoencoder 1005, which is input to the speaker classifier 1205.

At the time indicated in FIG. 13, the autoencoder 1005 and the speaker classifier 1205 have been trained and their weights have been stored and fixed. According to this example, feedback from the loss function determination block 535 is not used to change the weights of the autoencoder 1005 or the speaker classifier 1205, but is instead used to modify the values of Z_s until the speaker classifier 1205 classifies the modified source speaker's speech as being the target speaker's speech.

The process of modifying the values of Z_s may, in some implementations, include a reverse optimization process, such as a stochastic gradient descent process. In one example, the stochastic gradient descent process may be based on the following model function F:

$$y = F(x, w) \quad \text{(Equation 2)}$$

In Equation 2, F represent a model function having parameters w, input x and output y. Based on Equation 2, one may construct a loss function L as follows:

$$\text{Loss} = L(F(x,w), Y) \quad \text{(Equation 3)}$$

In Equation 3, Y represents the ground truth label. In a normal process of training a neural network, one seeks to update the values of w. However, in this example the neural network has been trained and the values of w are fixed. Therefore, in this example the reverse optimization process may involve updating or optimizing the value of x in order to minimize the value of L in Equation 3. In pseudocode, one example of this process can be described as follows. Repeat the following process until L (F(x, w), Y) reaches an approximate minimum:

$$\text{For } i=1,2,\ldots n, \text{ do } x = x - \eta \nabla Li(x) \quad \text{(Equation 4)}$$

In Equation 4, η represents the learning rate. In this example, x represents encoded audio data received from the autoencoder 1005.

Figure 14:
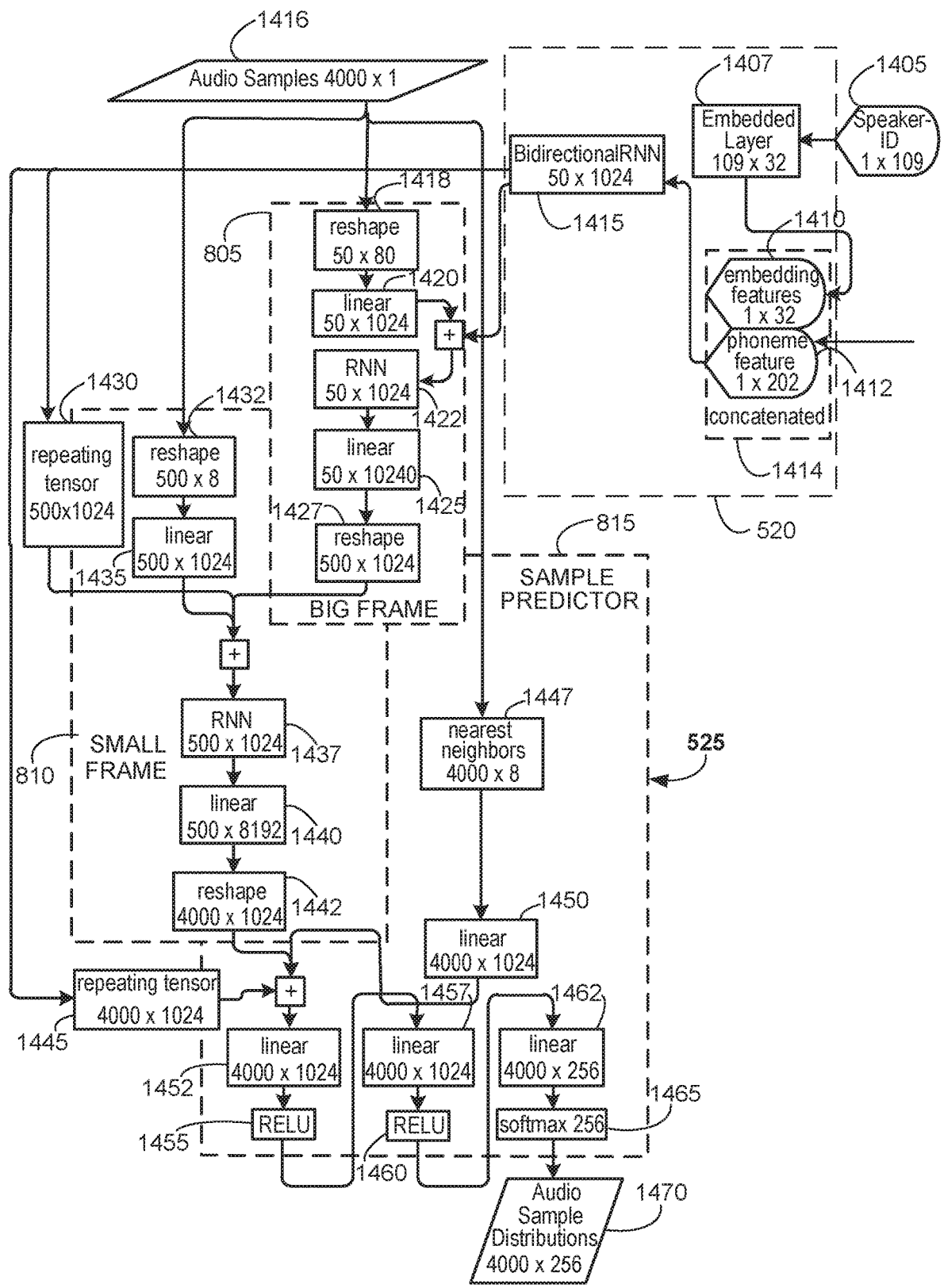
FIG. 14 illustrates blocks of a conditioning neural network and a voice modeling neural network according to one example.

FIG. 14 illustrates blocks of a conditioning neural network and a voice modeling neural network according to one example. The blocks of FIG. 14 may, for example, be implemented via a control system such as the control system 315 shown in FIG. 3 and described above. In some such examples, blocks of FIG. 14 may be implemented by a control system according to software instructions stored on one or more non-transitory media. The frame sizes, frame rates, numbers of elements and types of elements shown in FIG. 14 are merely examples.

According to this example, the conditioning neural network 520 includes a bi-directional RNN 1415. In this example, the conditioning neural network 520 also includes block 1407, in which speech characteristic data of a plurality of speakers (109 speakers in this instance) are stored. According to this example, the speech characteristic data correspond to the speech characteristics of target speakers that have been learned by the conditioning neural network 520 during processes of training the conditioning neural network 520 for each of the speakers. In some implementations, block 1407 may include pointers to memory locations in which speech characteristic data are stored. Although in this example the speech characteristic data are represented by 32-dimensional vectors, in other examples the speech characteristic data may be represented in other ways, such as by vectors of other dimensionality.

In this example, block 1405 represents a particular target speaker that has been selected, e.g., according to input received from a user. Speaker identification data from block 1405 is provided to block 1407, which provides speech characteristic data 1410 to the concatenation block 1414. In this implementation, the concatenation block 1414 also receives phoneme features 1412 (e.g., from a content extraction block, such as the content extraction block 505 described above).

In this example, the concatenation block 1414 is configured to concatenate the speech characteristic data 1410 with the phoneme features 1412 and to provide the output to the bi-directional RNN 1415. The bi-directional RNN 1415 may, for example, be configured to function as described above (e.g., with reference to FIG. 7).

In this example, the voice modeling neural network 525 includes modules 805, 810 and 815, each of which operates at a different temporal resolution. In this example, the module 805 processes more samples per frame than module 810 and the module 815 processes more samples per frame than module 805. In some such examples, the module 805 processes ten times more samples per frame than module 810 and the module 815 processes eighty times more samples per frame than module 810. According to some such implementations, the voice modeling neural network 525 may comprise a modified version of a SampleRNN neural network as described above. However, these are merely examples. In other implementations, the voice modeling neural network 525 may include a different numbers of modules and/or the modules may be configured to process different frame sizes.

Because the modules 805, 810 and 815 each operate at a different temporal resolution, in this example the conditioning neural network 520 provides output of different frame sizes to each of the modules 805, 810 and 815. According to this example, the conditioning neural network 520 provides 50 frames having a size of 1024 samples to the module 805 during a time interval that corresponds to the 50 frames, e.g., a time interval during which the conditioning neural network 520 generated the 50 frames. Here, the conditioning neural network 520 provides 50 frames having a size of 1024 samples to the repeating tensor block 1430, which repeats the 50 frames 10 times and provides the module 810 with 500 frames having a size of 1024 samples. In this example, the conditioning neural network 520 provides 50 frames having a size of 1024 samples to the repeating tensor block 1445, which repeats the 50 frames 80 times and provides the module 815 with 4000 frames having a size of 1024 samples.

According to this example, the module 805 includes a reshaping block 1418 that is configured to reshape a single frame of 4000 audio samples to 50 frames having 80 samples each. In this example, the linear operations block 1420 is configured to perform linear operations on each frame such that 1024 samples per frame are created from the 80 samples per frame output by the reshaping block 1418. In some such examples, the linear operations block 1420 is configured to perform linear operations on each frame via matrix multiplication according to the following equation:

$$Y = X * W \quad \text{(Equation 5)}$$

In equation 5, X represents an input matrix, which in this example has dimensions of 50 by 80 and corresponds to the output of the reshaping block 1418. In Equation 5, Y represents an output matrix of dimension 50 by 1024 and W represents a matrix of dimension 80 by 1024. Therefore, the output of the linear operations block 1420 has the same number of frames and the same frame size as the output of the bidirectional RNN 1415, so that the output of the linear operations block 1420 and the output of the bidirectional RNN 1415 may be summed and provided to the RNN 1422.

The linear operations block 1425 is configured to perform linear operations on each frame such that 10240 samples per frame are created from the 1024 samples per frame output by the RNN 1422. In some examples, the linear operations block 1425 is configured to perform linear operations on each frame via matrix multiplication. The reshaping block 1427, in this example, is configured to reshape 50 frames of 10240 audio samples to 500 frames having 1024 samples each. Therefore, the output of the reshaping block 1427 may be summed with the output of the repeating tensor block 1430.

In this example, the reshaping block 1432 is configured to reshape one frame of input audio data having 4000 samples to 500 frames having 8 samples each. The linear operations block 1435 is configured to perform linear operations on each frame such that 1024 samples are created from the 8 samples per frame output by the reshaping block 1432. In some examples, the linear operations block 1435 is configured to perform linear operations on each frame via matrix multiplication. After these operations, the output of the linear operations block 1435 may be summed with the output of the reshaping block 1427 and the output of the repeating tensor block 1430.

This summation is provided to the RNN 1437 in this example. Here, the output of the RNN 1437 is provided to the linear operations block 1440, which in this example is configured to perform linear operations on each frame such that 8192 samples per frame are created from the 1024 samples per frame output by the RNN 1437. In some examples, the linear operations block 1440 is configured to perform linear operations on each frame via matrix multiplication. In this example, the reshaping block 1442 is configured to reshape 500 frames of data having 8192 samples each to 4000 frames having 1024 samples each. The output of the reshaping block 1442 then has the same dimensionality as the output of the repeating tensor block 1445 and may therefore be summed with the output of the repeating tensor block 1445.

According to this example, the module 815 includes a nearest neighbors block 1447, which is configured to provide the previous 7 samples along with the current sample of audio data to the linear operations block 1450. In this implementation the linear operations block 1450 is configured to perform linear operations on each frame such that 1024 samples per frame are created from the 8 samples per frame output by the nearest neighbors block 1447. The output of the linear operations block 1450 then has the same dimensionality as the output of the repeating tensor block 1445 and may therefore be summed with the output of the repeating tensor block 1445 and the output of the reshaping block 1442. In some alternative implementations, block 1447 and block 1450 may be replaced by a single convolution layer, e.g., with a total of 1024 filters, each filter's size being 8 by 1. With a filter size of 8×1, the convolution filters could operate on the previous 7 samples and the current sample.

The resulting summation is provided to the linear operations block 1452. In this example, the linear operations block 1452 is configured to be one portion of a multilayer perceptron that also includes the linear operations block 1457 and the linear operations block 1462. The output of the linear operations block 1452 is provided to the ReLU block 1455, which provides its output to the linear operations block 1457. The output of the linear operations block 1457 is provided to the ReLU block 1460, which provides its output to the linear operations block 1462. In this example, the linear operations block 1462 is configured to perform linear operations on each frame such that 256 samples per frame are created from the 1024 samples per frame output by the ReLU block 1460. In this implementation, the audio data is 8-bit audio data and therefore the 256 samples per frame correspond to the number of possible audio sample values of the input audio data.

According to this implementation, block 1465 applies a softmax function to the output of the linear operations block 1462. In this example, the softmax function provides a classification for each of the 256 values or classes per frame. In this example, the output data 1470 that is output by the voice modeling neural network 525 includes audio sample distributions, which indicate a probability for each of the 256 values or classes per frame.

The general principles defined herein may be applied to other implementations without departing from the scope of the appended claims. Thus, the claims are not intended to be limited to the implementations shown herein, but are to be accorded the widest scope consistent with this disclosure, the principles and the novel features disclosed herein.

What is claimed is:

1. A computer-implemented audio processing method, comprising:
    training a speech synthesizer, wherein the training comprises:
        (a) receiving, by a content extraction process implemented via a control system comprising one or more processors and one or more non-transitory storage media, first audio data corresponding to first speech of a first person;
        (b) producing, by the content extraction process, a first time-stamped phoneme sequence and first pitch contour data corresponding to the first speech;
        (c) receiving, by a first neural network implemented via the control system, the first time-stamped phoneme sequence and the first pitch contour data;
        (d) producing, by the first neural network, first neural network output corresponding to the first time-stamped phoneme sequence and the first pitch contour data, the first neural network output comprising a plurality of frame sizes;
        (e) receiving, by a second neural network implemented via the control system, the first neural network output, the second neural network comprising a hierarchy of modules, each module operating at a different temporal resolution, wherein the first neural network has produced the first neural network output such that each of the plurality of frame sizes of the first neural network output corresponds to a temporal resolution of a module of the second neural network;
        (f) generating, by the second neural network, first predicted audio signals;
        (g) comparing, via the control system, the first predicted audio signals to first test data, the test data being audio data corresponding to speech of the first person;
        (h) determining, via the control system, a loss function value for the first predicted audio signals; and
        (i) repeating (a) through (h) until a difference between a current loss function value for the first predicted audio signals and a prior loss function value for the first predicted audio signals is less than or equal to a predetermined value, wherein repeating (f) comprises changing a physical state of at least one non-transitory storage medium location corresponding with at least one weight of the second neural network.

2. The audio processing method of claim 1, wherein (a) further comprises receiving first time-stamped text corresponding to the first speech of the first person.

3. The audio processing method of claim 1, wherein (a) further comprises receiving first identification data corresponding to the first person.

4. The audio processing method of claim 3, further comprising controlling the speech synthesizer for speech generation, wherein the speech generation comprises:
    (j) receiving, by the content extraction process, second audio data corresponding to second speech of a second person, second time-stamped text corresponding to the second speech and first identification data corresponding to speech of the first person;
    (k) producing, by the content extraction process, a second time-stamped phoneme sequence and second pitch contour data corresponding to the second speech;

(l) receiving, by the first neural network, the second time-stamped phoneme sequence and the second pitch contour data of (k);
(m) producing, by the first neural network, first neural network output corresponding to the second time-stamped phoneme sequence and the second pitch contour data of (k);
(n) receiving, by the second neural network, the first neural network output of (m) and the first identification data; and
(o) generating, by the second neural network, synthesized audio data corresponding to the first neural network output of (m) and the first identification data.

5. The audio processing method of claim 4, wherein the synthesized audio data corresponds to words uttered by the second person according to speech characteristics of the first person.

6. The audio processing method of claim 5, wherein the training involves receiving the first audio data in a first language and wherein the synthesized audio data corresponds to words uttered by the second person in a second language.

7. The audio processing method of claim 4, further comprising causing one or more transducers to reproduce the synthesized audio data.

8. The audio processing method of claim 4, wherein the training further comprises:
receiving, by a third neural network, the first audio data; and
training the third neural network to determine first speech characteristics corresponding to speech of the first person and to output encoded audio data.

9. The audio processing method of claim 8, wherein the training further comprises training a fourth neural network to determine whether the encoded audio data corresponds to speech of the first person.

10. The audio processing method of claim 9, wherein the speech generation further comprises:
receiving, by the third neural network, the second audio data;
generating, by the third neural network, second encoded audio data corresponding to the second audio data;
receiving, by the fourth neural network, the second encoded audio data;
generating modified second encoded audio data via an iterative process until the fourth neural network determines that the modified second encoded audio data corresponds to speech of the first person and, after the fourth neural network determines that the modified second encoded audio data corresponds to speech of the first person, providing the modified second encoded audio data to the second neural network.

11. The audio processing method of claim 1, wherein repeating (a) through (h) involves training at least one of the first neural network or the second neural network via backward propagation based on a current loss function value.

12. The audio processing method of claim 1, wherein the first neural network comprises a bi-directional recurrent neural network.

13. A speech synthesizing apparatus, comprising: an interface system; and
a control system comprising one or more processors and one or more non-transitory storage media operatively coupled to the one or more processors, the control system configured for implementing a speech synthesizer, the speech synthesizer including a content extractor, a first neural network and a second neural network, the first neural network comprising a bi-directional recurrent neural network, the second neural network comprising a hierarchy of modules, each module operating at a different temporal resolution, the first neural network and the second neural network having been trained according to a process comprising:
(a) receiving, via the interface system and by the content extractor, first audio data corresponding to first speech of a first person;
(b) producing, by the content extractor, a first time-stamped phoneme sequence and first pitch contour data corresponding to the first speech;
(c) receiving, by the first neural network, the first time-stamped phoneme sequence and the first pitch contour data;
(d) producing, by the first neural network, first neural network output corresponding to the first time-stamped phoneme sequence and the first pitch contour data, the first neural network output comprising a plurality of frame sizes, each of the frame sizes corresponding with a temporal resolution of a module of the second neural network;
(e) receiving, by the second neural network, the first neural network output;
(f) generating, by the second neural network, first predicted audio signals;
(g) comparing the first predicted audio signals to first test data, the test data being audio data corresponding to speech of the first person;
(h) determining a loss function value for the first predicted audio signals; and
(i) repeating (a) through (h) until a difference between a current loss function value for the first predicted audio signals and a prior loss function value for the first predicted audio signals is less than or equal to a predetermined value, wherein the control system is configured for controlling the speech synthesizer module for speech generation and wherein the speech generation comprises:
(j) receiving, by the content extractor and via the interface system, second audio data corresponding to second speech of a second person, second time-stamped text corresponding to the second speech and first identification data corresponding to speech of the first person;
(k) producing, by the content extractor, a second time-stamped phoneme sequence and second pitch contour data corresponding to the second speech;
(l) receiving, by the first neural network, the second time-stamped phoneme sequence and the second pitch contour data of (k);
(m) producing, by the first neural network, first neural network output corresponding to the second time-stamped phoneme sequence and the second pitch contour data of (k);
(n) receiving, by the second neural network, the first neural network output of (m) and the first identification data; and
(o) generating, by the second neural network, synthesized audio data corresponding to the first neural network output of (m) and the first identification data.

14. The speech synthesizing apparatus of claim 13, wherein the synthesized audio data corresponds to words uttered by the second person according to speech characteristics of the first person.

15. The speech synthesizing apparatus of claim 14, wherein the training involves receiving the first audio data in a first language and wherein the synthesized audio data corresponds to words uttered by the second person in a second language.

16. The speech synthesizing apparatus of claim 13, wherein the control system is configured for causing one or more transducers to reproduce the second synthesized audio data.

17. The speech synthesizing apparatus of claim 13, wherein generating the synthesized audio data comprises changing a physical state of at least one non-transitory storage medium location corresponding with at least one weight of the second neural network.

18. A speech synthesizing apparatus, comprising:
an interface system; and
a control system comprising one or more processors and one or more non-transitory storage media operatively coupled to the one or more processors, the control system configured for implementing a speech synthesizer, the speech synthesizer including a content extractor, a first neural network and a second neural network, the first neural network comprising a bi-directional recurrent neural network, the second neural network comprising a hierarchy of modules, each module operating at a different temporal resolution, the second neural network having been trained to generate first synthesized audio data corresponding to first speech of a first speaker by means of an audio processing method according to claim 1, wherein the control system is configured for controlling the speech synthesizer for:
(a) receiving, by the content extractor and via the interface system, second audio data corresponding to second speech of a second person, second time-stamped text corresponding to the second speech and first identification data corresponding to speech of the first person;
(b) producing, by the content extractor, a second time-stamped phoneme sequence and second pitch contour data corresponding to the second speech;
(c) receiving, by the first neural network, the second time-stamped phoneme sequence and the second pitch contour data of (b);
(d) producing, by the first neural network, first neural network output corresponding to the second time-stamped phoneme sequence and the second pitch contour data of (b), the first neural network output comprising a plurality of frame sizes, each of the frame sizes corresponding with a temporal resolution of a module of the second neural network;
(e) receiving, by the second neural network, the first neural network output of (d) and the first identification data; and
(f) generating, by the second neural network, second synthesized audio data corresponding to the first neural network output of (d) and the first identification data.

19. The speech synthesizing apparatus of claim 18, wherein the second synthesized audio data corresponds to words uttered by the second person according to speech characteristics of the first person.

20. The speech synthesizing apparatus of claim 19, wherein the training involves receiving the first audio data in a first language and wherein the second synthesized audio data corresponds to words uttered by the second person in a second language.

21. The speech synthesizing apparatus of claim 18, further comprising causing one or more transducers to reproduce the second synthesized audio data.

22. The speech synthesizing apparatus of claim 18, wherein generating the synthesized audio data comprises changing a physical state of at least one non-transitory storage medium location corresponding with at least one weight of the second neural network.

23. A speech synthesizing apparatus, comprising: an interface system; and
a control system comprising one or more processors and one or more non-transitory storage media operatively coupled to the one or more processors, the control system configured for implementing a speech synthesizer, the speech synthesizer including a content extractor, a first neural network and a second neural network, the first neural network comprising a bi-directional recurrent neural network, the second neural network comprising a hierarchy of modules, each module operating at a different temporal resolution, the first neural network and the second neural network having been trained according to a process comprising:
(a) receiving, via the interface system and by the content extractor, first audio data corresponding to first speech of a target speaker;
(b) producing, by the content extractor, a first time-stamped phoneme sequence and first pitch contour data corresponding to the first speech;
(c) receiving, by the first neural network, the first time-stamped phoneme sequence and the first pitch contour data;
(d) producing, by the first neural network, first neural network output corresponding to the first time-stamped phoneme sequence and the first pitch contour data, the first neural network output comprising a plurality of frame sizes, each of the frame sizes corresponding with a temporal resolution of a module of the second neural network;
(e) receiving, by the second neural network, the first neural network output;
(f) generating, by the second neural network, first predicted audio signals;
(g) comparing the first predicted audio signals to first test data;
(h) determining a loss function value for the first predicted audio signals; and
(i) repeating (a) through (h) until a difference between a current loss function value for the first predicted audio signals and a prior loss function value for the first predicted audio signals is less than or equal to a predetermined value, wherein the control system is configured for controlling the speech synthesizer module for speech generation and wherein the speech generation comprises:
(j) receiving, by the content extractor and via the interface system, second audio data corresponding to second speech of a source speaker, second time-stamped text corresponding to the second speech and first identification data corresponding to speech of the target speaker;
(k) producing, by the content extractor, a second time-stamped phoneme sequence and second pitch contour data corresponding to the second speech;
(l) receiving, by the first neural network, the second time-stamped phoneme sequence and the second pitch contour data of (k);

(m) producing, by the first neural network, first neural network output corresponding to the second time-stamped phoneme sequence and the second pitch contour data of (k);

(n) receiving, by the second neural network, the first neural network output of (m) and the first identification data; and (o) generating, by the second neural network, synthesized audio data corresponding to the first neural network output of (m) and the first identification data.

24. The speech synthesizing apparatus of claim 23, wherein the synthesized audio data corresponds to words uttered by the source speaker according to speech characteristics of the target speaker.

25. The speech synthesizing apparatus of claim 23, wherein the target speaker and the source speaker are the same person at different ages.

26. The speech synthesizing apparatus of claim 23, wherein the first speech of the target speaker corresponds to speech of a person at a first age, or during a range of ages that includes the first age, and the second speech of the source speaker corresponds to speech of the person at a second age.

27. The speech synthesizing apparatus of claim 23, wherein the first age is a younger age than the second age.

\* \* \* \* \*

UNITED STATES PATENT AND TRADEMARK OFFICE
CERTIFICATE OF CORRECTION

PATENT NO. : 11,538,455 B2
APPLICATION NO. : 16/969950
DATED : December 27, 2022
INVENTOR(S) : Zhou et al.

It is certified that error appears in the above-identified patent and that said Letters Patent is hereby corrected as shown below:

On the Title Page

Item (60) Related U.S. Application Data: where "provisional application No. 62/710,501, filed on Feb. 16, 2019" should read --provisional application No. 62/710,501, filed on Feb. 16, 2018--.

Signed and Sealed this
Fourth Day of April, 2023

Katherine Kelly Vidal
*Director of the United States Patent and Trademark Office*